US006334308B1

(12) United States Patent

Sato et al.

(10) Patent No.: US 6,334,308 B1
(45) Date of Patent: Jan. 1, 2002

(54) PRESSURE COMPENSATING VALVE, UNLOADING PRESSURE CONTROL VALVE AND HYDRAULICALLY OPERATED DEVICE

(75) Inventors: Yasuhiro Sato; Ryoji Wakisaka; Nobumi Yoshida, all of Oyama (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 09/261,390

(22) Filed: Mar. 3, 1999

(30) Foreign Application Priority Data

| | | |
|---|---|---|
| Mar. 4, 1998 | (JP) | 10-051892 |
| Mar. 4, 1998 | (JP) | 10-051913 |
| Mar. 4, 1998 | (JP) | 10-051924 |
| Dec. 14, 1998 | (JP) | 10-354823 |
| Jan. 12, 1999 | (JP) | 11-005502 |
| Jan. 12, 1999 | (JP) | 11-005503 |

(51) Int. Cl.[7] .......... F16D 31/02
(52) U.S. Cl. .......... 60/422; 60/452; 60/468
(58) Field of Search .......... 60/422, 452, 468; 91/445, 446, 447

(56) References Cited

U.S. PATENT DOCUMENTS

| | | | | | |
|---|---|---|---|---|---|
| 4,794,846 | A | * | 1/1989 | Von Der Loy et al. | 91/451 |
| 4,967,554 | A | * | 11/1990 | Kauss | 60/452 |
| 5,077,975 | A | * | 1/1992 | Kauss | 60/452 |
| 5,129,229 | A | * | 7/1992 | Nakamura et al. | 60/452 |
| 5,129,230 | A | * | 7/1992 | Ixuma et al. | 60/452 |
| 5,398,507 | A | * | 3/1995 | Akiyama et al. | 60/452 |

FOREIGN PATENT DOCUMENTS

| | | | | |
|---|---|---|---|---|
| JP | 187411 | * | 7/1993 | 60/468 |

OTHER PUBLICATIONS

Yeaple, F. D. "Electrohydraulc Valves and Servosystems" in Fluid Power Design Handbook, (New York, Marcel Dekker, Inc, 1996) 1, pp. 82–92, TJ843.yb3, 1995.*

* cited by examiner

*Primary Examiner*—F. Daniel Lopez
(74) *Attorney, Agent, or Firm*—Varndell & Varndell, PLLC

(57) ABSTRACT

A pressure compensating valve (7) comprises a main valve (20) that is operated in such a way as to increase the area of the opening between an inlet port (24) and an outlet port (25) by means of pressure acting on a first pressure receiving component (21). The pressure compensating valve (7) is also operated in such a way as to reduce the area of the opening by means of pressure acting on a second pressure receiving component (22) and pressure acting on a third pressure receiving component (23). The pressure compensating valve (7) is designed to allow the pressure (Pa) of the pressurized oil flowing to the inlet port (24) to act on the first pressure receiving component (21) and the pressure (Pb) of the load driven by the pressurized oil flowing from the outlet port (25) to act on the second pressure receiving component (22). A control pressure producer (7B) is provided for allowing control pressure (Pe) resulting from a reduction in the pressure (Pa) of the inlet port (24) to act on the third pressure receiving component (23). An unloading pressure control valve and an variable bleed valve can also be provided. This structure allows the pressure compensated characteristics to be changed as desired. The unloading start pressure is also preset so as to improve response in terms of the hydraulic actuators. Energy loss can also be minimized, allowing the rapid start-up of the hydraulic actuators to be controlled, machines can be made smaller, and high precision control can be achieved.

3 Claims, 27 Drawing Sheets

PRESSURE COMPENSATING VALVE, UNLOADING PRESSURE CONTROL VALVE AND HYDRAULICALLY OPERATED DEVICE

FIELD OF THE INVENTION

The present invention relates to a pressure compensating valve, an unloading pressure control valve, and a hydraulically operated device.

DESCRIPTION OF THE RELATED ART

FIG. 25 depicts a hydraulically operated device described in Japanese Unexamined Patent Application 1-247805.

In this hydraulically operated device, a variable delivery pump A is connected to a low pressure hydraulic cylinder D via a pressure compensating valve B and a directional control valve (operating valve) C. The pump A is also connected to a high pressure cylinder D' via a pressure compensating valve B' and a directional control valve C'.

An actuator E for changing the displacement volume and a flow regulating valve F for controlling the actuator E are attached to the hydraulic pump A.

The higher load pressure among the load pressures that are produced during the operation of the cylinders D and D' is sensed by a shuttle valve G as the maximum load pressure $P_{LS}$, and this maximum load pressure $P_{LS}$ is output as the pilot pressure to the flow regulating valve F.

The flow regulating valve F controls the actuator E so that the discharge pressure $P_P$ of the pump A is always greater than the maximum load pressure $P_{LS}$.

The cylinders D and D' are jointly operated by the simultaneous operation of directional control valves C and C' in the hydraulically operated device. At this time, the pressure compensating valve B controls the amount of oil supplied to the cylinder D so that the difference between the input pressure and the output pressure of the directional control valve C is constant, and the pressure compensating valve B' similarly controls the amount of oil supplied to the cylinder D' so that the difference between the input pressure and the output pressure of the directional control valve C' is constant.

The hydraulically operated device equipped with the pressure compensating valves B and B' can prevent the disadvantage of pressured oil accumulating and being supplied to the cylinder with the lighter load among the operating valve cylinders D and D'.

According to the aforementioned Japanese Unexamined Patent Application 1-247805, however, the discharge pressure of pump A decreases upon the supply of large amounts of pressured oil to the hydraulic cylinder D with the lower pressure during periods of considerable control input to the directional control valves C and C'. In such cases, the pressure difference before and after the pressure compensating valve B fails to reach the compensated pressure difference, and the pressure compensating valve B thus fails to achieve pressure compensation. That is, the pressure compensating valve B remains open.

While the pressure compensating valve B fails to achieve pressure compensation, the amount of pressured oil supplied to the hydraulic cylinder D with the lower pressure is uncontrolled, so no pressurized oil is supplied to the hydraulic cylinder D' with the higher pressure, and the hydraulic cylinder D' with the higher pressure is thus not operated. The operator must then operate the directional control valve C in the slightly open direction to control the flow rate to the hydraulic cylinder D with the lower pressure.

To prevent such a situation from developing, the aforementioned hydraulically operated device is provided with a pressure difference sensing device H for sensing the pressure difference $P_P - P_{LS}$ between the pressure $P_P$ of the pressured oil discharged from the hydraulic pump A and the maximum load pressure $P_{LS}$, a control force set device I for setting the control force fc based on the pressure difference $P_P - P_{LS}$ and the relationship depicted in FIG. 26, and an electromagnetic valve J that is operated by means of the output signals from the control force setting device I.

The control force fc is given by the following equation.

$$fc = f - \alpha(P_P - P_{LS})$$

Where f: the pressing force of springs b and $b^-$ in pressure compensating valves B and B'

α: constant

The electromagnetic valve J allows pressured oil corresponding to the control force fc to act on the pressure receiving components of the pressure compensating valves B and B' when the pressure difference $P_P - P_{LS}$ is at or below the specific pressure difference Pm shown in FIG. 26.

This allows the control force fc against the pressing force f of the aforementioned springs b and $b^-$ to be exerted on the springs in the pressure compensating valves B and B'. The force fc increases the discharge pressure of the pump A by increasing the flow resistance of the pressure compensating valves B and B', allowing pressured oil to be supplied to the hydraulic cylinder D' with the higher pressure.

When the cylinders D and D' are cylinders that operate an operating device in construction machinery (such as a hydraulic shovel boom, arm, or bucket), the pressure compensation characteristics of the pressure compensating valves B and B' are preferably modified in some cases to improve the operating characteristics, depending on the operating configuration of the aforementioned operating device.

A technique that is capable of changing the throttle levels for each pressure compensating valve and that is capable of suitably changing the pressure difference before and after the directional control valves C and C' has been disclosed in the aforementioned patent publication. That is, in this technique, electromagnetic valves J as described above are provided for the pressure compensating valves B and B', and the control force fc for the pressure compensating valves B and B' are individually adjusted by these electromagnetic valves J. Accordingly, the throttle levels of the pressure compensating valves B and B' are individually changed; that is, the pressure differences before and after the direction control valves C and C' are different from each other.

A state in which the required flow rate is distributed completely irrespective of load is also referred to in particular as a fully compensated state.

The conventional devices described above suffer from the following drawbacks, however.

In some cases, pressure compensation is not possible when the mechanism for producing control force fc to modify the pressure compensation characteristics malfunctions. Furthermore, the electromagnetic valves J are operated by computations after the pressure difference has been sensed by a pressure difference detector 21H, resulting in poor response.

In view of the foregoing, a first object of the present invention is to provide a pressure compensating valve that allows the pressure compensation characteristics to be arbitrarily modified, that has good response, and that is highly reliable.

FIG. 27 depicts a hydraulically operated device described in Japanese Unexamined Patent Application 4-250226. When the operating device A in this hydraulically operated device is operated, a flow regulating valve (operating valve) B is operated, by means of the pilot pressure produced by the operating device A, to an extent corresponding to the extent to which the operating device A has been operated, and the discharged pressured oil from a hydraulic pump D is consequently supplied to a hydraulic cylinder (hydraulic actuator) C.

A pressure compensating valve E for keeping the pressure difference before and after the flow regulating valve B at a constant level is located between the hydraulic pump D and the flow regulating valve (operating valve) B.

An operating device A', flow regulating valve (operating valve) B', hydraulic motor (hydraulic actuator) C', and pressure compensating valve E' each correspond to the operating device A, flow regulating valve (operating valve) B, hydraulic cylinder C, and pressure compensating valve E.

An unloading pressure control valve F is connected in parallel to the hydraulic pump D. The higher pressure between the load pressure acting on the hydraulic cylinder C and the load pressure acting on the hydraulic motor C' is sensed as the maximum load pressure by a shuttle valve G, and this maximum load pressure is allowed to act on the unloading pressure control valve F.

The unloading pressure control valve F is provided to return the discharged oil from the hydraulic pump D to the tank. The amount of the aforementioned discharged oil returned by the unloading pressure control valve F is set by the difference between the maximum load pressure and the discharge pressure of the hydraulic pump D, and by control signals output from a control unit J.

A computer H connected to the control unit J computes the difference $\Delta P_{LS}$ between the discharge pressure of the hydraulic pump D and the load pressure of the hydraulic cylinder C or hydraulic motor C' based on the functional relation shown in FIG. 28 and the output of sensors a1, a2 and a1', a2' for sensing the control input of the operating devices A and A'.

The function shown in FIG. 28 defines a relation in which the pressure difference $\Delta P_{LS}$ increases proportionally until the control input St of the operating device A reaches a set value, and the pressure difference $\Delta P_{LS}$ stays at a value $\Delta P_{LS}1$ when the control input St is at or beyond the set value.

When the control input St is 20%, for example, the pressure difference $\Delta P_{LS}$ is computed by the computer H, so a control signal corresponding to a pressure difference $\Delta P_{LS2}$ is output from the control unit J, and the unloading start pressure of the unloading pressure control valve F is set to pressure difference $\Delta P_{LS2}$. As a result, the amount of pressured oil supplied through the pressure compensating valve E' and flow regulating valve B' to the hydraulic motor C' is the amount defined by the pressure difference $\Delta P_{LS2}$.

FIG. 29 shows the relation between the amount of oil Q supplied to the hydraulic motor C' and the pressure difference $\Delta P$ before and after the flow regulating valve B' when the control input St is 20%.

As shown in FIG. 29, the pressure compensating valve E' supplies pressured oil in a constant oil amount q2 to the hydraulic motor C' so that the pressure difference $\Delta P$ of the flow regulating valve B' is kept at a constant pressure difference $\Delta Pc+\Delta P_{LS}$ ($\Delta P_{LS}$ is the pressure loss of the pressure compensating valve E'). However, while the pressure difference $\Delta P$ has not yet reached the constant pressure difference $\Delta Pc+\Delta P_{LS}$ (compensated pressure difference), the pressured oil is supplied to the hydraulic motor C' in the oil amount q1 defined by the unloading start pressure $\Delta P_{LS2}$ of the unloading pressure control valve F.

Thus, according to this hydraulically operated device, when the control input of the operating device A is set to about 20% for moderate acceleration of the hydraulic motor C', the amount of oil supplied to the hydraulic motor C' is limited to the amount of oil q1 defined by the unloading start pressure $\Delta P_{LS2}$, and the hydraulic motor C' is thus moderately accelerated.

Furthermore, in the case of the load sensing circuit of a variable delivery pump, when the unloading start pressure of the unloading pressure control valve F is pre-modified, the amount of pressured oil discharged from the hydraulic pump D is increased in advance. The response of the hydraulic cylinder C when operated by the operating unit A is thus better.

The unloading start pressure of the unloading pressure control valve F is variable. However, the unloading start pressure is set through the computer H and the control unit J. It is accordingly always set after the output from the sensors a1, a2 and a1', a2' of the operating devices A and A', and a resulting problem is the poor response in terms of the hydraulic cylinder C or the hydraulic motor C'. More specifically, when the fluctuations in the load pressure of the hydraulic cylinder C or hydraulic motor C' are estimated, the unloading start pressure is hopefully pre-modified rapidly irrespective of the control input of the operating devices A and A'. For the reasons described above, however, the unloading start pressure is difficult to modify in advance.

In view of the foregoing, a second object of the present invention is to provide an unloading pressure control valve allowing the unloading start pressure to be preset so as to improve the response in terms of a hydraulic actuator.

A pump discharge pressure control means for controlling the displacement volume of a hydraulic pump (discharge volume per revolution) is provided in a hydraulically operated device in which the pressured oil discharged from a variable delivery pump is supplied to a hydraulic actuator such as a hydraulic cylinder by the operation of an operating valve. This pump discharge pressure control means is designed so as to control the displacement volume of a hydraulic pump based on the discharge pressure of a hydraulic pump and the load pressure acting on a hydraulic actuator, so that the aforementioned discharge pressure is greater by a specific pressure than the aforementioned load pressure.

According to the hydraulically operated device equipped with the pump discharge pressure control means, when the load pressure is increased during the operation of the operating valve, the displacement volume of the hydraulic pump immediately increases to a magnitude corresponding to the load pressure. The actuator is also connected via a pressure compensating valve. A flow rate corresponding to the control input of the operating valve can thus be supplied, irrespective of the magnitude of the load pressure, to the actuator.

To be supplied at flow rate corresponding to the control input is, in other words, a matter of the action of pressure corresponding to the load. The control input of the operating valve at this time and certain actuator conditions sometimes result in rapid start up with shocks.

When the aforementioned hydraulic actuator is a hydraulic motor or cylinder driving an operating unit in construction machinery (such as the revolving superstructure, boom, arm, or bucket in the case of a hydraulic shovel, for example), the rapid start up of the aforementioned hydraulic actuator results in lower operating performance, depending on the operating configuration.

Hydraulically operated devices such as the following have been proposed in patent publications.

That is, in the hydraulically operated device proposed in Japanese Unexamined Patent Application 9-222101, for example, a bleed valve is connected to the discharge channel of the aforementioned hydraulic pump, and part of the pressured oil discharged by the hydraulic pump is bled through the bleed valve to the tank.

According to the hydraulically operated device described in this patent publication, the rapid start up of the hydraulic actuator is controlled, resulting in better operating performance.

However, the bleed valve used in the hydraulically operated device of the aforementioned patent publication bleeds off part of the pressured oil discharged from the hydraulic pump to the tank. In other words, a large amount of the pressured oil that is supposed to be supplied to the hydraulic actuator ends up being returned to the tank when bled off. This results in significant energy loss.

Other resulting problems are the need for large-scale machines because of the large amounts of pressured oil that are bled off, poor sensitivity, and difficulties in achieving high-precision control.

In view of the foregoing, a third object of the present invention is to provide a hydraulically operated device that allows energy loss to be minimized to control rapid start up of hydraulic actuators, and that also allows machinery to be made more compact and high-precision control to be achieved.

Another object of the present invention is to simultaneously achieve the first and second objects.

Still another object of the present invention is to simultaneously achieve the first and third objects.

Yet another object of the present invention is to simultaneously achieve the second and third objects.

And finally another object of the present invention is to simultaneously achieve the first, second, and third objects.

SUMMARY OF THE INVENTION

To achieve the first object, the first of the present inventions is a pressure compensating valve through which passes pressured oil that is fed from a hydraulic pump 1 to a hydraulic actuator 5, characterized by comprising a main valve 20 that is operated in such a way as to increase the area of the opening between an inlet port 24 and an outlet port 25 by means of pressure acting on a first pressure receiving component 21, that is also operated in such a way as to reduce the area of the opening by means of pressure acting on a second pressure receiving component 22 and pressure acting on a third pressure receiving component 23, and that is designed to allow the pressure Pa of the pressured oil flowing to the inlet port 24 to act on the first pressure receiving component 21 and the pressure Pb of the load 5 driven by the pressured oil flowing from the outlet port 25 to act on the second pressure receiving component 22; and control pressure producing means 7B for allowing control pressure Pe resulting from a reduction in the pressure Pa of the inlet port 24 to act on the third pressure receiving component 23.

The first invention allows the desired pressure compensation characteristics to be obtained by changing the control pressure Pe because the pressure compensation characteristics are changed according to the magnitude of the control pressure Pe.

Because the control pressure Pe resulting from a reduction in the pressure of the inlet port 24 is allowed to act on the third pressure receiving component 23 of the main valve 20, fluctuations in the control pressure Pe also correspond to fluctuations in the pressure of the inlet port 24. The pressure compensation characteristics are thus unaffected by the pressure fluctuation of the inlet port 24 of the main valve 20.

To achieve the second object described above, the second invention is an unloading pressure control valve for introducing discharged pressured oil from a hydraulic pump 1 to a tank according to the pressure difference between the discharge pressure $P_P$ of the hydraulic pump 1 and the load pressure $P_{LS}$ of a hydraulic actuator 5, characterized by comprising a main valve 100 that is constructed in such a way as to operate in the communicating direction by means of the discharge pressure $P_P$ of the hydraulic pump 1 acting on a first pressure receiving component 123, to operate in the cut-off direction upon load pressure $P_{LS}$ to a second pressure receiving component 124, and to change the balance of the operating force in each of the directions by means of control pressure Pg acting on a third pressure receiving component 125; and control pressure producing means 101 for producing the control pressure Pg.

The second invention allows the unloading start pressure to be set by means of the control pressure Pg acting on the third pressure receiving component 125. The control pressure Pg is produced by means of the control pressure producing means. Accordingly, the unloading start pressure can be preset by the control pressure producing means, and the amount of pressured oil discharged from the hydraulic pump 1 can be increased in advance to improve the response in terms of the hydraulic actuator 5.

To achieve the third object described above, the third invention is a hydraulically operated device comprising a plurality of hydraulic actuators 5 to which pressured oil discharged from a variable delivery pump 1 is supplied via pressure compensating valves 7 and directional control valves 4; means for outputting pressure $P_{LS}$ to a load pressure sensing passage 9 according to the maximum load pressure among the load pressures acting on the actuators; and pump discharge pressure control means for controlling the discharge pressure of the hydraulic pump 1 based on the pressure $P_{LS}$; wherein the hydraulically operated device is characterized in that a variable bleed valve 11 is located in the load pressure sensing passage 9.

The third invention allows the amount discharged from the hydraulic pump 1 to be controlled by bleeding off the pressured oil in the load pressure sensing passage 9. The amount flowing in the load pressure sensing channel 9 is generally quite low. The pump pressure is controlled according to the pressure of the load pressure sensing passage 9, whereas the pressure of the load pressure sensing passage 9 is the pressure corresponding to the load pressure of the actuator and thus reacts exactly to the fluctuations in the load pressure of the actuator. It also reacts promptly to fluctuations in the load pressure. Energy loss can thus be minimized, and machines can be made more compact. The amount discharged from the hydraulic pump 1 can be controlled with greater precision.

To achieve the first and second objects described above, the fourth of the inventions is a hydraulically operated device comprising a pressure compensating valve through which passes pressured oil that is fed from a hydraulic pump 1 to a hydraulic actuator 5; and an unloading pressure control valve for introducing discharged pressured oil from the hydraulic pump 1 to a tank according to the pressure difference between the discharge pressure $P_P$ of the hydraulic pump 1 and the load pressure $P_{LS}$ of the hydraulic actuator 5; wherein the hydraulically operated device is characterized by comprising a pressure compensating valve 7 itself comprising a pressure compensated main valve 20 that is operated in such a way as to increase the area of the opening between an inlet port 24 and an outlet port 25 by means of pressure acting on a first pressure receiving component 21 for a pressure compensating valve, that is also operated in such a way as to reduce the area of the opening by means of pressure acting on a second pressure receiving component 22 for a pressure compensating valve and pressure acting on a third pressure receiving component 23 for a pressure compensating valve, and that is designed to allow the pressure Pa of the pressured oil flowing to the inlet port 24 to act on the first pressure receiving component 21 for a pressure compensating valve and the pressure Pb of the load 5 driven by the pressured oil flowing from the outlet port 25 to act on the second pressure receiving component 22 for a pressure compensating valve, and control pressure producing means 7B for allowing control pressure Pe resulting from a reduction in the pressure Pa of the inlet port 24 to act on the third pressure receiving component 23 for a pressure compensating valve; and an unloading pressure control valve 10 itself comprising a main valve 100 for an unloading pressure control valve, that is constructed in such a way as to operate in the communicating direction by means of the discharge pressure $P_P$ of the hydraulic pump 1 acting on a first pressure receiving component 123 for an unloading pressure control valve, to operate in the cut-off direction upon load pressure $P_{LS}$ to a second pressure receiving component 124 for an unloading pressure control valve, and to change the balance of the operating force in each of the directions by means of control pressure Pg acting on a third pressure receiving component 125 for an unloading pressure control valve, and control pressure producing means 101 for producing the control pressure Pg.

According to the fourth invention, the pressure compensation characteristics are changed according to the magnitude of the control pressure Pe, allowing the desired pressure compensation characteristics to be obtained by changing the control pressure Pe.

Because the control pressure Pe resulting from a reduction in the pressure of the inlet port 24 is allowed to act on the third pressure receiving component 23 for a pressure compensating valve in the main valve 20 for a pressure compensating valve, the control pressure Pe also fluctuates according to the fluctuations in the pressure of the inlet port 24. The pressure compensation characteristics are thus unaffected by the pressure fluctuations in the inlet port 24 of the main valve 20.

Furthermore, the unloading start pressure can be set by means of the control pressure Pg acting on the third pressure receiving component 125 for an unloading pressure control valve. The control pressure Pg is produced by the control pressure producing means. The unloading start pressure can thus be preset by the control pressure producing means, and the amount of pressured oil discharged from the hydraulic pump 1 can be increased in advance to improve the response in terms of the hydraulic actuator 5.

To achieve the first and third objects described above, the fifth of the inventions is a hydraulically operated device comprising a plurality of hydraulic actuators 5 to which pressured oil discharged from a variable delivery pump 1 is supplied via pressure compensating valves and directional control valves 4; means 8 for outputting pressure $P_{LS}$ to a load pressure sensing passage 9 according to the maximum load pressure among the load pressures acting on the actuators 5; and pump discharge pressure control means 12 for controlling the discharge pressure of the hydraulic pump 1 based on the pressure $P_{LS}$; wherein the hydraulically operated device is characterized by comprising a pressure compensating valve 7 itself comprising a main valve 20 that is operated in such a way as to increase the area of the opening between an inlet port 24 and an outlet port 25 by means of pressure acting on a first pressure receiving component 21, that is also operated in such a way as to reduce the area of the opening by means of pressure acting on a second pressure receiving component 22 and pressure acting on a third pressure receiving component 23, and that is designed to allow the pressure Pa of the pressured oil flowing to the inlet port 24 to act on the first pressure receiving component 21 and the pressure Pb of the load 5 driven by the pressured oil flowing from the outlet port 25 to act on the second pressure receiving component 22, and control pressure producing means 7B for allowing control pressure Pe resulting from a reduction in the pressure Pa of the inlet port 24 to act on the third pressure receiving component 23; and a variable bleed valve 11 is located in the load pressure sensing passage 9.

According to the fifth invention, the pressure compensation characteristics are changed according to the magnitude of the control pressure Pe, allowing the desired pressure compensation characteristics to be obtained by changing the control pressure Pe.

Because the control pressure Pe resulting from a reduction in the pressure of the inlet port 24 is allowed to act on the third pressure receiving component 23 of the main valve 20, the control pressure Pe also fluctuates according to the fluctuations in the pressure of the inlet port 24. The pressure compensation characteristics are thus unaffected by the pressure fluctuations in the inlet port 24 of the main valve 20.

Furthermore, the amount discharged from the hydraulic pump 1 can be controlled by bleeding off the pressured oil in the load pressure sensing passage 9. The amount flowing in the load pressure sensing channel 9 is generally quite low. The pump pressure is controlled according to the pressure of the load pressure sensing passage 9, whereas the pressure of the load pressure sensing passage 9 is the pressure corresponding to the load pressure of the actuator and thus reacts exactly to the fluctuations in the load pressure of the actuator. It also reacts promptly to fluctuations in the load pressure. Energy loss can thus be minimized, and machines can be made more compact. The amount discharged from the hydraulic pump 1 can be controlled with greater precision.

To achieve the second and third objects described above, the sixth of the present inventions is a hydraulically operated device comprising a plurality of hydraulic actuators 5 to which pressured oil discharged from a variable delivery pump 1 is supplied via pressure compensating valves 7 and directional control valves 4; means 8 for outputting pressure $P_{LS}$ to a load pressure sensing passage 9 according to the maximum load pressure among the load pressures acting on the actuators 5; pump discharge pressure control means 12 for controlling the discharge pressure of the hydraulic pump 1 based on the pressure $P_{LS}$; and an unloading pressure control valve for introducing discharged pressured oil from the hydraulic pump 1 to a tank according to the pressure difference between the discharge pressure $P_P$ of the variable delivery pump 1 and the load pressure $P_{LS}$ of the hydraulic actuators 5; wherein the hydraulically operated device is characterized by comprising an unloading pressure control valve 10 itself comprising a main valve 100 that is constructed in such a way as to operate in the communicating direction by means of the discharge pressure $P_P$ of the hydraulic pump 1 acting on a first pressure receiving component 123, to operate in the cut-off direction upon load pressure $P_{LS}$ to a second pressure receiving component 124, and to change the balance of the operating force in each of the directions by means of control pressure Pg acting on a third pressure receiving component 125, and control pressure producing means 101 for producing the control pressure Pg; and a variable bleed valve 11 is located in the load pressure sensing passage 9.

According to the sixth invention, the unloading start pressure can be set by means of the control pressure Pg acting on the third pressure receiving component 25. The control pressure Pg is produced by means of the control pressure producing means. Accordingly, the unloading start pressure can be preset by the control pressure producing means, and the amount of pressured oil discharged from the hydraulic pump 1 can be increased in advance to improve the response in terms of the hydraulic actuator 5.

The amount discharged from the hydraulic pump 1 can be controlled by bleeding off the pressured oil in the load pressure sensing passage 9. The amount flowing in the load pressure sensing channel 9 is generally quite low. The pump pressure is controlled according to the pressure of the load pressure sensing passage 9, whereas the pressure of the load pressure sensing passage 9 is the pressure corresponding to the load pressure of the actuator and thus reacts exactly to the fluctuations in the load pressure of the actuator. It also reacts promptly to fluctuations in the load pressure. Energy loss can thus be minimized, and machines can be made more compact. The amount discharged from the hydraulic pump 1 can be controlled with greater precision.

To achieve the first, second, and third objects described above, the seventh of the present inventions is a hydraulically operated device comprising a plurality of hydraulic actuators 5 to which pressured oil discharged from a variable delivery pump 1 is supplied via pressure compensating valves and directional control valves 4; means 8 for outputting pressure $P_{LS}$ to a load pressure sensing passage 9 according to the maximum load pressure among the load pressures acting on the actuators 5; pump discharge pressure control means 12 for controlling the discharge pressure of the variable delivery pump 1 based on the pressure $P_{LS}$; and an unloading pressure control valve for introducing discharged pressured oil from the variable delivery pump 1 to a tank according to the pressure difference between the discharge pressure $P_P$ of the variable delivery pump 1 and the load pressure $P_{LS}$ of the hydraulic actuators 5; wherein the hydraulically operated device is characterized by comprising a pressure compensating valve 7 itself comprising a pressure compensated main valve 20 for a pressure compensating valve, that is operated in such a way as to increase the area of the opening between an inlet port 24 and an outlet port 25 by means of pressure acting on a first pressure receiving component 21 for a pressure compensating valve, that is also operated in such a way as to reduce the area of the opening by means of pressure acting on a second pressure receiving component 22 for a pressure compensating valve and pressure acting on a third pressure receiving component 23 for a pressure compensating valve, and that is designed to allow the pressure Pa of the pressured oil flowing to the inlet port 24 to act on the first pressure receiving component 21 for a pressure compensating valve and the pressure Pb of the load 5 driven by the pressured oil flowing from the outlet port 25 to act on the second pressure receiving component 22 for a pressure compensating valve, and control pressure producing means 7B for allowing control pressure Pe resulting from a reduction in the pressure Pa of the inlet port 24 to act on the third pressure receiving component 23 for a pressure compensating valve; and an unloading pressure control valve 10 itself comprising a main valve 100 for an unloading pressure control valve, that is constructed in such a way as to operate in the communicating direction by means of the discharge pressure $P_P$ of the hydraulic pump 1 acting on a first pressure receiving component 123 for an unloading pressure control valve, to operate in the cut-off direction upon load pressure $P_{LS}$ to a second pressure receiving component 124 for an unloading pressure control valve, and to change the balance of the operating force in each of the directions by means of control pressure Pg acting on a third pressure receiving component 125 for an unloading pressure control valve, and control pressure producing means 101 for producing the control pressure Pg; and a variable bleed valve 11 is located in the load pressure sensing passage 9.

According to the seventh invention, the pressure compensation characteristics are changed according to the magnitude of the control pressure Pe, allowing the desired pressure compensation characteristics to be obtained by changing the control pressure Pe.

Because the control pressure Pe resulting from a reduction in the pressure of the inlet port 24 is allowed to act on the third pressure receiving component 23 for a pressure compensating valve in the main valve 20 for a pressure compensating valve, the control pressure Pe also fluctuates according to fluctuations in the pressure of the inlet port 24. The pressure compensation characteristics are thus unaffected by the fluctuations in the inlet port 24 of the main valve 20 for a pressure compensating valve.

Furthermore, the unloading start pressure can be set by means of the control pressure Pg acting on the third pressure receiving component 125 for an unloading pressure control valve. The control pressure Pg is produced by means of the control pressure producing means. Accordingly, the unloading start pressure can be preset by the control pressure producing means, and the amount of pressured oil discharged from the hydraulic pump 1 can be increased in advance to improve the response in terms of the hydraulic actuators 5.

The amount discharged from the hydraulic pump 1 can be controlled by bleeding off the pressured oil in the load pressure sensing passage 9. The amount flowing in the load pressure sensing channel 9 is generally quite low. The pump pressure is controlled according to the pressure of the load pressure sensing passage 9, whereas the pressure of the load pressure sensing passage 9 is the pressure corresponding to the load pressure of the actuators and thus reacts exactly to the fluctuations in the load pressure of the actuators. It also reacts promptly to fluctuations in the load pressure. Energy loss can thus be minimized, and machines can be made more compact. The amount discharged from the hydraulic pump 1 can be controlled with greater precision.

DESCRIPTION OF THE EMBODIMENTS

Embodiments of the present invention are described in detail below with reference to the attached drawings.

Figure 1:
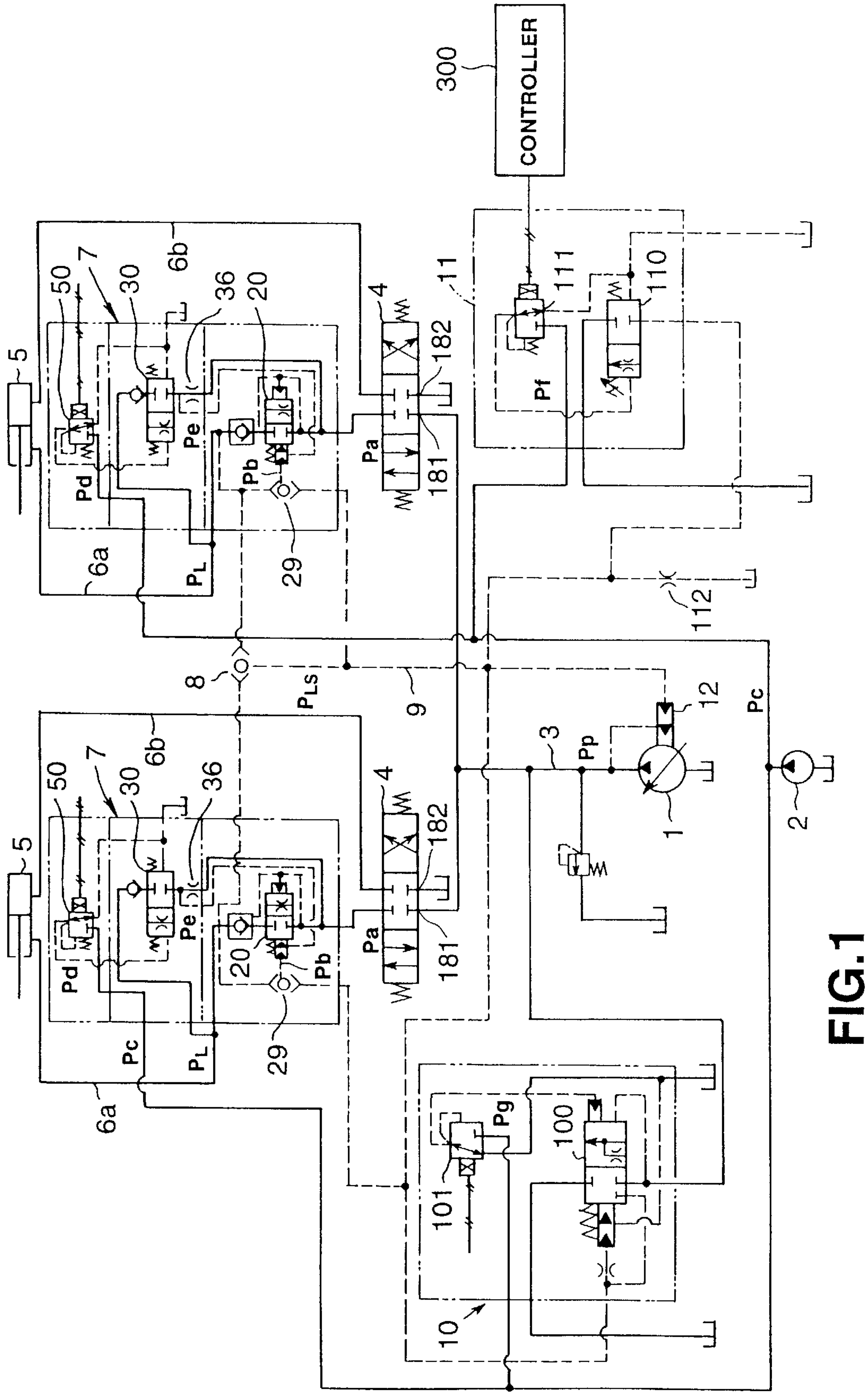
FIG. 1 is a circuit diagram of the oil pressure in a hydraulically operated device relating to the present invention.

FIG. 1 depicts an embodiment of a hydraulically operated device relating to the present invention. The hydraulically operated device can be used for a hydraulic shovel, for example.

The hydraulically operated device comprises a variable delivery pump 1, auxiliary hydraulic pump 2, a plurality of closed center operating valves (directional control valves) 4 to which the oil discharged from the hydraulic pump 1 is supplied through an oil passage 3, and a plurality of hydraulic cylinders 5 corresponding to each operating valve 4.

The head oil chambers of the hydraulic cylinders 5 are connected by means of oil passages 6*a* and pressure compensating valves 7 to the operating valves 4, and the bottom oil chambers are connected by means of a pressure compensating valve not shown in the figure in an oil passage 6*b* to the operating valves 4. A pressure compensating valve is in fact interposed in the oil passage 6*b,* but thus pressure compensating valve has been left out in FIG. 1 to avoid complicating the drawing.

The load pressure Pl of the hydraulic cylinders 5 connected thereto act on each of the oil passages 6*a*. The maximum load pressure among the load pressures P1 acting on these oil passages 6*a* are sensed as the maximum load pressure $P_{LS}$ by a shuttle valve 8, and the sensed maximum load pressure $P_{LS}$ is allowed by means of an oil passage (load pressure sensing passage) 9 to act on the hydraulic pump 1, pressure compensating valves 7, unloading pressure control valve 10, and variable bleed valve 11. A fixed throttle 13 is interposed between the tank and the oil passage 9 into which the pressured oil with the maximum load pressure $P_{LS}$ is introduced.

A pump discharge pressure control means 12 is attached to the hydraulic pump 1. The pump discharge pressure control means 12 introduces the discharge pressure $P_P$ of the hydraulic pump 1 and the maximum load pressure $P_{LS}$, and controls the displacement volume of the hydraulic pump 1 so that the discharge pressure $P_P$ is always slightly higher than the maximum load pressure $P_{LS}$.

The structure of the pressure compensating valve 7 relating to the present invention is described below with reference to FIG. 2. The pressure compensating valve 7 is composed of a compensator 7A, a control pressure producing component 7B, and a pilot pressure supply component 7C.

The compensator 7A has a main valve 20. The main valve 20 comprises a first pressure receiving component 21, a second pressure receiving component 22, and a third pressure receiving component 23. The pressure Pa acting on the first pressure receiving component 21 acts in such a way as to increase the area of the opening between the inlet port 24 and outlet port 25. The pressure Pb acting on the second pressure receiving component 22 and the pressure Pc acting on the third pressure receiving component 23 act in such a way as to reduce the area of the opening along with the elastic force of a spring 26.

The inlet port 24 is connected to the outlet port of the operating valve 4 depicted in FIG. 1. The pressure Pa of the inlet port 24 acts on the first pressure receiving component 21 via an oil passage 27. The outlet port 25 is connected to the oil passage 6*a* through a load check valve 28.

A shuttle valve 29 senses the load pressure P1 acting on the oil passage 6*a* and the greater pressure Pb among the maximum load pressure $P_{LS}$, and allows the pressure Pb to act on the second pressure receiving component 22 of the main valve 20.

The control pressure producing component 7B has a variable throttle valve 30. The variable throttle valve 30 is operated in such a way as to reduce the area of the opening between an inlet port 32 and an outlet port 33 by means of the elastic force of a spring 31. It is also operated in such a way as to increase the area of the opening by means of the elastic force of a spring 35 and the pilot pressure P2 acting on a pressure receiving component 34.

In ordinary cases, the spring 35 is used only in the initial fine tuning of the variable throttle valve 30, and is not indispensable. The tank port pressure is allowed to act constantly on the spring 31 to ensure that the variable throttle valve 30 is operated more rapidly.

The inlet port 32 of the variable throttle valve 30 is connected to the inlet port 24 of the main valve 20 by way of an oil passage 37 equipped with a throttle 36. The pressure Pe of the inlet port 32 of the variable throttle valve 30 acts on the third pressure receiving component 23 of the main valve 20.

The outlet port 33 of the variable throttle valve 30 is connected to the oil passage 6*a* by way of an oil passage 40 equipped with a check valve 39. The pressure Pe acting on the third pressure receiving component 23 of the main valve 20 is thus determined by the pressure Pa of the inlet port 24 of the main valve 20, the load pressure P1, and the throttle levels of the throttle 36 and the variable throttle valve 30. Pe=Pa when the variable throttle valve 30 is closed.

The pilot pressure Pd is given as the output pressure of an electromagnetic proportional pressure control valve 50 located in the pilot pressure supply component 7C. The electromagnetic proportional pressure control valve 50 introduces the pressured oil discharged from the pilot hydraulic pump 2 depicted in FIG. 1 to an inlet port 52. The pressure Pc of this pressured oil is lowered to the pilot pressure Pd by means of the electricity applied to a solenoid 53. The pilot pressure Pd displays a magnitude proportional to the amount of electricity to the solenoid 53.

When zero electricity is supplied to the solenoid 53, the outlet port 55 communicates with the tank port 56 by means of the elastic force of a spring 54, as shown in the figure. The pressure Pd acting on the pressure receiving component 34 of the variable throttle valve 30 is thus zero. With this, the inlet port 32 and outlet port 33 of the variable throttle valve 30 are blocked off from each other by the elastic force of the spring 31, both sides of which are acted upon by the tank port pressure.

The discharge pressure of the pilot hydraulic pump 2 is held constant by constant pressure means not shown in the figure.

The specific structures of the operating valve 4 and pressure compensating valve 7 are described below.

As noted above, pressure compensating valves 7 are interposed not only in oil passages 6*a* but also in oil passages 6*b* in the hydraulically operated device in FIG. 1.

Figure 3:
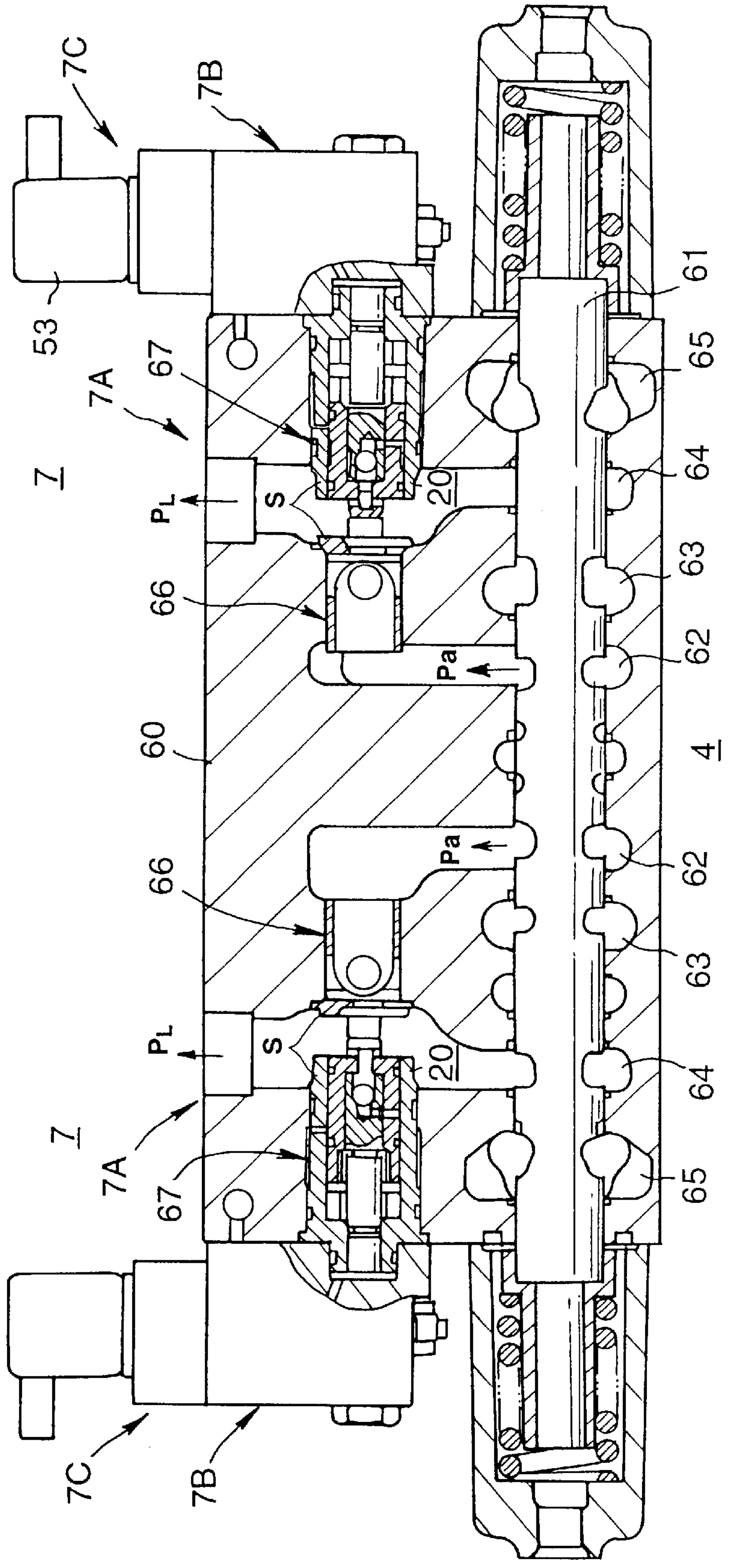
FIG. 3 is a longitudinal cross section depicting the attachment of a pressure compensating valve and an operating valve relating to the present invention.

FIG. 3 depicts an example of the structure of an operating valve 4 by which pressured oil is selectively supplied to the two pressure compensating valves 7 described above.

The operating valve 4 has a structure in which a body 60 is provided with a spool 61, pairs of left and right outlet ports 62, pairs of left and right pump ports 63, pairs of left and right actuator ports 64, and pairs of left and right of tank ports 65.

The spool 61 blocks all of the ports 62 through 65 in the center valve state depicted in the figure. When the spool 61 moves left from the center valve state, the outlet ports 62 on one side communicate with the pump ports 63, and the actuator ports 64 on the other side communicate with the tank ports 65. When the spool 61 moves right from the center valve state, the outlet ports 65 on the other side communicate with the pump ports 63, and the actuator ports 64 on the first side communicate with the tank ports 65.

The main valve 20 located in the compensator 7A of the pressure compensating valve 7 has a valve component 66A interposed between the actuator port 64 and the outlet port 62 of the operating valve 4, and a pressing component 67 connected to the valve component 66A.

Figure 4:
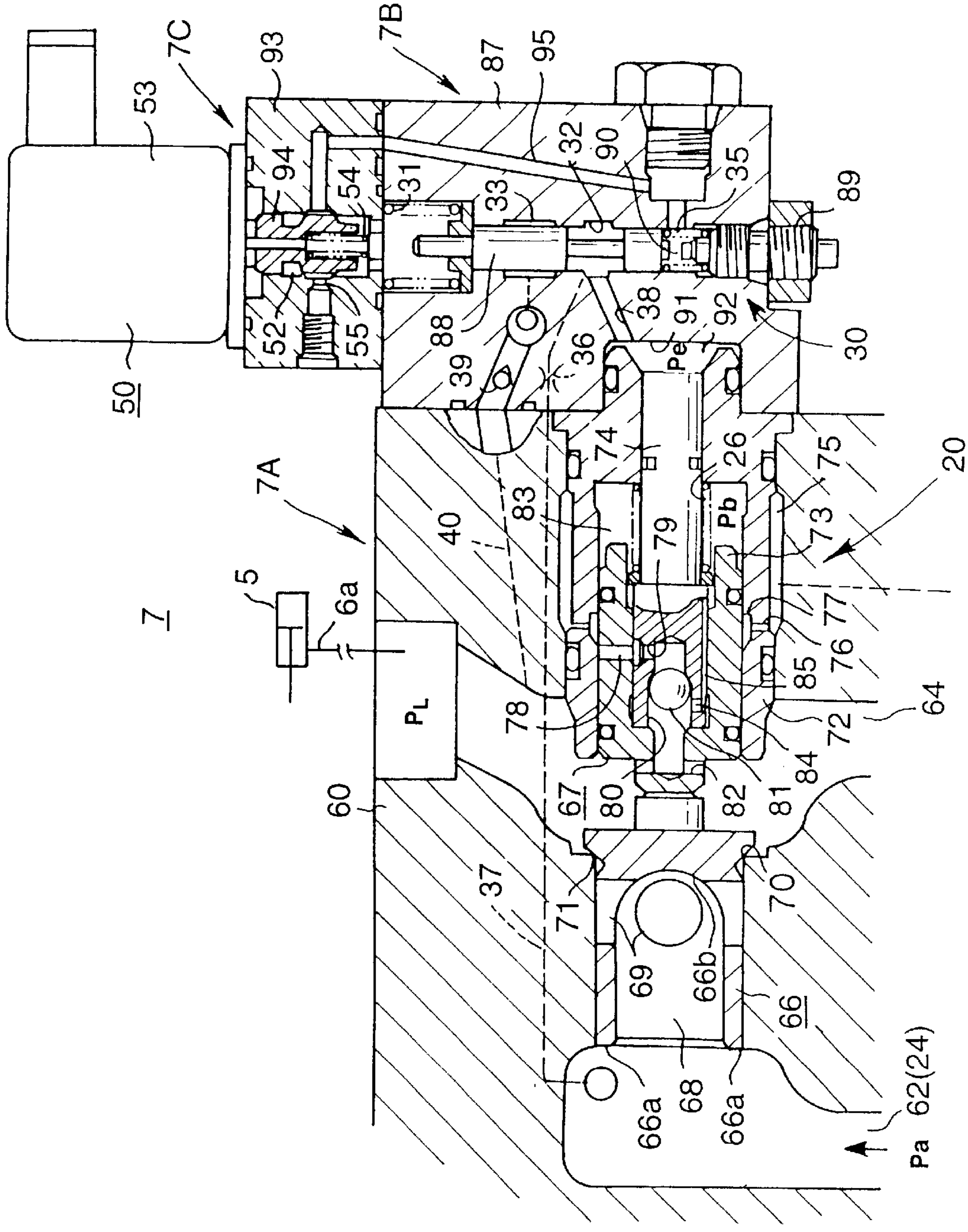
FIG. 4 is a longitudinal cross section, depicting the structure of a pressure compensating valve relating to the present invention.

FIG. 4 depicts an enlargement of the pressure compensating valve 7. As shown in FIG. 4, the valve component 66 comprises a hollow component 68 open at the left end, a hole 69 open in the outer peripheral surface through the hollow component 68, and a seat surface 71 that presses into contact with a seat 70 formed in the body 60. Pressure-receiving surfaces 66*a* and 66*b* of the valve component 66 form the first pressure receiving component 21 of the main valve 20 depicted in FIG. 2, and the hole 69 of the valve component 66 forms the outlet port 25 of the main valve 20. The entire valve component 66 functions as the load check valve 39 depicted in FIG. 2.

The pressing component 67 is positioned on an extension of the central axis of the valve component 66, and comprises a piston 73 that slides to the left and right in a sleeve 72 fixed to the body 60, a sliding element 74 that slides to the left and right in the piston 73, and a spring 26 (see FIG. 2) interposed between the sleeve 72 and the sliding element 74.

An annular space 75 into which the pressured oil with the maximum 1 load pressure $P_{LS}$ (see FIG. 2) is introduced is formed between the body 60 and the sleeve 72. The pressured oil with the maximum load pressure $P_{LS}$ introduced into this annular space 75 flows into a stepped hole 80 in the sliding element 74 through a fine hole 76 located in the sleeve 72, an annular groove 77, a hole 78 located in the piston 73, and an inlet port 79 located in the sliding element 74, and acts on the right side of a bore 81 located in the stepped hole 80.

Meanwhile, the pressured oil in the actuator port 64 of the operating valve 4 depicted in FIG. 3, that is, the pressured oil with the pressure load P1 flowing through the oil passage 6*a,* flows through an inlet port 82 located in the left end of the piston 73 and into the stepped hole 80 of the sliding element 74, and acts on the left side of the bore 81.

When the relation between the pressures $P_{LS}$ and P1 is such that $P_{LS}$ is greater than P1, the bore 81 rotates to the left position of the outlet port 84, and when $P_{LS}$ is less than P1, the bore 81 rotates to the right position of the outlet port 84.

Figure 2:
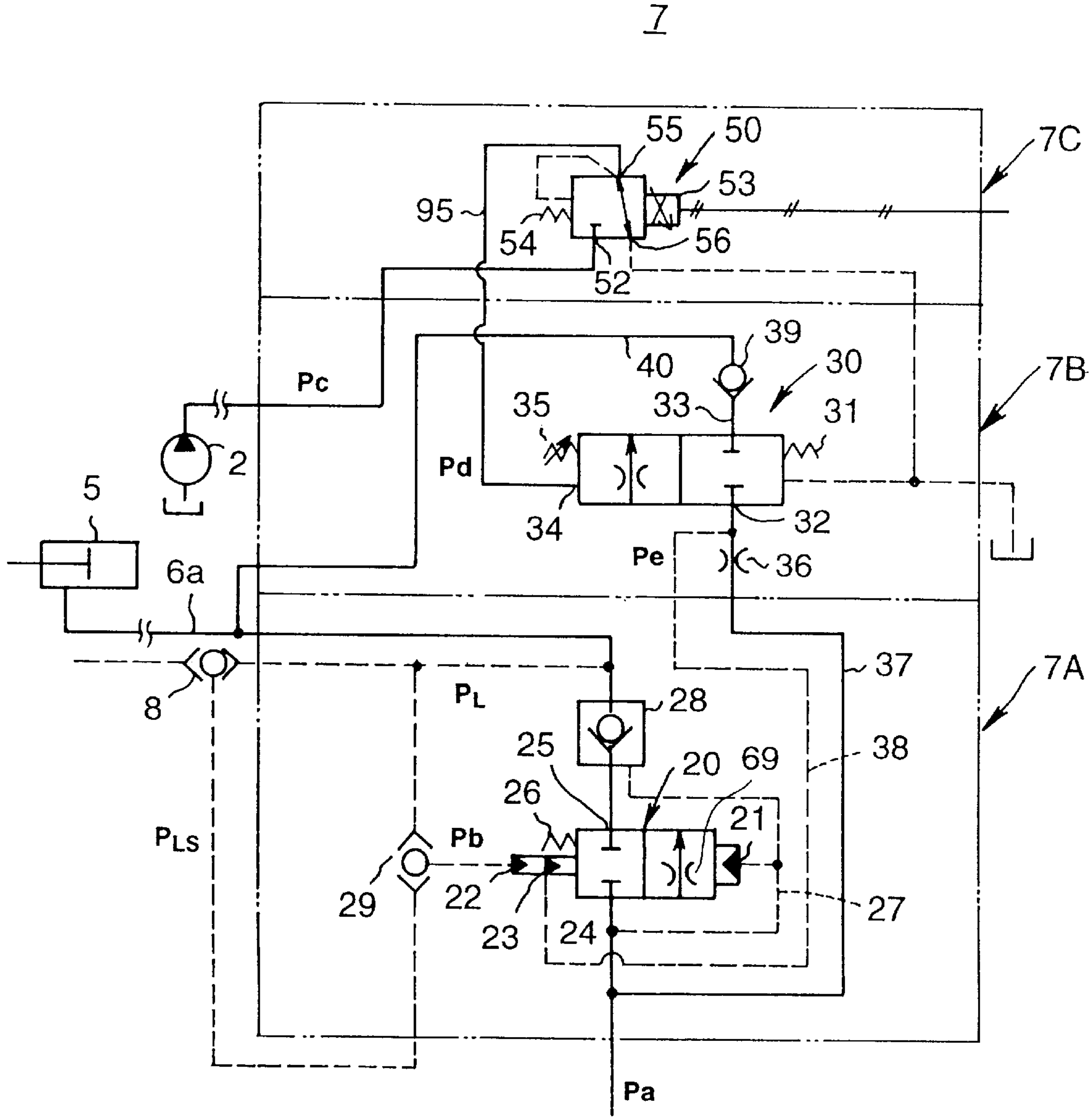
FIG. 2 is a circuit diagram of oil pressure, depicting the structure of a pressure compensating valve relating to the present invention.

As shown in FIGS. 1 and 2, $P_{LS}$<P1 is a state of transition, where the pressure $P_{LS}$ increases so that $P_{LS}$=P1.

The stepped hole 80 communicates with a pressure chamber 83 through the outlet port 84 and a convex groove 85 located in the outer peripheral surface thereof. Thus, when $P_{LS}$>P1, the pressured oil with the maximum load pressure $P_{LS}$ is introduced into the pressure chamber 83, and when $P_{LS}$<P1, the pressured oil with load pressure P1 is introduced into the pressure chamber 83.

As described above, the stepped hole 80 and bore 81 have the function of sensing the higher oil pressure between the oil pressure $P_{LS}$ and P1, and of guiding it into the pressure chamber 83. The shuttle valve 29 depicted in FIG. 2 is composed of the stepped hole 80 and the bore 81. The pressure of the pressured oil introduced into the pressure chamber 83 is pressure Pb depicted in FIG. 2.

The pressure chamber 83 is a space enclosed by the inner surface of the sleeve 72, the right end surface of the piston 73, and the outer peripheral surface of the sliding element 74, where the right end surface of the piston 73 functions as the second pressure receiving component 22 depicted in FIG. 2.

The control pressure producing component 7B is described below. The control pressure producing component 7B is located to the side of the compensator 7A, and is equipped with the variable throttle valve 30 depicted in FIG. 2.

A spool 88 for changing the flow resistance (throttle level) between the inlet port 32 and outlet port 33 depicted in FIG. 2 is located in the vertical direction in the body 87 of the variable throttle valve 30.

The spool 88 is such that downwardly directed force (the direction in which the flow resistance increases) is provided by the spring 31, and upwardly directed force (the direction in which the flow resistance decreases) is given by the spring 35 in a pressure chamber 90 formed between the spool and an adjusting screw 89.

The bottom end surface of the spool 88 facing the pressure chamber 90 forms the pressure receiving component 34 depicted in FIG. 2.

The inner surface of a concave component 91 located in the left surface of the body 87 forms a pressure chamber 92 along with the right end surface of the sliding element 74 and the right end surface of the sleeve 72 of the compensator 7A. The right end surface of the sliding element 74 facing the pressure chamber 92 forms the second pressure receiving component 23 of the main valve 20 depicted in FIG. 2.

The inlet port 32 of the variable throttle valve 30 communicates through the oil passage 37 equipped with the throttle 36 to the outlet port 62 of the operating valve 4, that is, to the inlet port 24 of the main valve 20 depicted in FIG. 2, and also communicates through an oil passage 38 to the pressure chamber 92. The outlet port 33 communicates through the oil passage 40 equipped with the check valve 39 (see FIG. 2) to the actuator port 64 of the operating valve 4.

The pilot pressure producing component 7C is located in the top of the body 87 of the control pressure producing component 7B. The electromagnetic proportional pressure control valve 50 forming the pilot pressure producing component 7C comprises a spool 94 arranged in the vertical direction in the body 93, and a solenoid 53 that presses the spool 94 down against the spring 54.

In this electromagnetic proportional pressure control valve 50, the spool 94 is driven down by the thrust of the solenoid 53, allowing the flow resistance to be reduced between the inlet port 52 and the outlet port 55.

The outlet port 55 communicates through an oil passage 95 to the pressure chamber 90 of the variable throttle valve 30. The spool 94 also is positioned on the axis of the spool 88 of the control pressure producing component 7B.

The operation of the pressure compensating valve 7 having the aforementioned structure is described below with reference to FIG. 4.

The pressured oil with the pressure Pa flowing out of the outlet port 62 of the operating valve 4 presses the valve component 66 to the right by acting on the surfaces 66*a* and 66*b* of the valve component 66 forming the first pressure receiving component 21 of the main valve 20 depicted in FIG. 2.

Meanwhile, the pressured oil with the load pressure Pb (pressure P1 or $P_{LS}$) flowing into the pressure chamber 83 presses the valve component 66 to the left by acting on the right end surface of the piston 73 (second pressure receiving component 22 depicted in FIG. 2), and the pressured oil with the control pressure Pe flowing into the pressure chamber 92 presses the valve component 66 to the left by acting on the right end surface of the sliding element 74 (third pressure receiving component 23 depicted in FIG. 2). The spring 26 also presses the valve component 66 to the left by means of the sliding element 74.

The pressure balance in the main valve 20 can thus be expressed as in the following Eq. (1).

$$Pa \times A_0 = Pe \times A_1 + Pb(A_0 - A_1) + F_0 \qquad (1)$$

$$A0 > A1$$

$A_0$: sum of the area of surfaces 66*a* and 66*b* of valve component 66

$A_1$: area of right end surface of sliding element 74

$A_0-A_1$: area of right end surface of piston 73

$F_0$: elastic force of spring 26

The pressure Pe in Eq. (1) is the control pressure that changes the pressure compensation characteristics of the pressure compensating valve 7. The control pressure Pe results in pressure Pa when the variable throttle valve 30 of control pressure producing component 7B depicted in FIG. 2 is closed. The relation in Eq. (2) below is obtained by substituting Pa into Pe in Eq. (1).

$$Pa - Pb = F_0/(A_0 - A_1) \qquad (2)$$

As can be seen from this relation, the pressure compensating valve 7 is operated in such a way that the pressure difference Pa−Pb is constant when Pe=Pa. In other words, pressure compensation is achieved.

Thus, operating both operating valves 4 depicted in FIG. 1 to bring about the joint operation of the cylinders 5 avoids the drawback of pressured oil becoming concentrated and supplied to only the cylinder 5 with the lighter load.

When the variable throttle valve 30 of the control pressure producing component 7B is not closed, the pressured oil passing through the fixed throttle 36 flows through the variable throttle valve 30 and check valve 39 to the cylinder 5 end. Thus the control pressure Pe obtained by dividing the pressure difference between the pressures Pa and P1 by the throttling ratio between the throttle 36 and variable throttle valve 30, in other words, the control pressure Pe resulting from the reduction of the pressure Pa, acts on the third pressure receiving component 23 of the main valve 20 in the compensator 7A.

In this state, the leftward moving force of the sliding element 74 depicted in FIG. 4 is lower than when Pe=Pa.

Reducing the leftward moving force of the sliding element 74 is equal to lowering the elastic force Fe of the spring 26 in the Eq. (2). That is because, when the control force Pe is lower than Pa, the pressure difference Pa−Pb is set lower than when Pe=Pa (change in the pressure compensation characteristics). Here, the function of keeping the pressure difference Pa−Pb constant is still maintained, despite the change in the pressure compensation characteristics.

In the case of two or more cylinders with different loads, more pressured oil flows to the one with the lower load under conditions where the control input of the operating valves 4 is constant.

The control pressure Pe drops as the amount of electricity to the solenoid 53 of the electromagnetic proportional pressure control valve 50 increases. Accordingly, when an operating unit in construction machinery, for example (such as the boom, arm, or bucket in hydraulic shovels), is driven by cylinders 5, pressure compensation characteristics suitable for the operating configuration of such an operating unit can be set by controlling the amount of electricity to the solenoid 53.

The pressure compensation characteristics of pressure compensating valves 7 for a plurality of cylinders, as shown in FIG. 1, can also be altered, of course. The pressure compensation characteristics of the pressure compensating valves 7 for the series of cylinders 5 depicted in FIG. 3 can each be varied so as to alter the operating speeds during extension and retraction of the cylinders 5.

In the pressure compensating valves 7, the pilot pressure Pd no longer acts on the variable throttle valve 39 of the control pressure producing component 7B in the event of wire breakage in the solenoid 53 of the electromagnetic proportional pressure control valve 50 or in the event of malfunctions of the pilot pump 2 depicted in FIG. 1, for example. In other words, the variable throttle 39 is no longer capable of throttling operations.

Despite such accidents, however, there is no loss of the pressure compensation characteristics of the pressure compensating valves 7. Only a fully compensated state results.

That is, when the variable throttle 39 is closed, the magnitude of the control pressure Pe is changed, making it impossible to change the pressure compensation characteristics. However, since the control pressure Pe is set to Pe=Pa, it is still possible to maintain pressure compensation operations keeping the pressure difference Pa−Pb shown in the Eq. (2) at a constant level.

Figure 5:
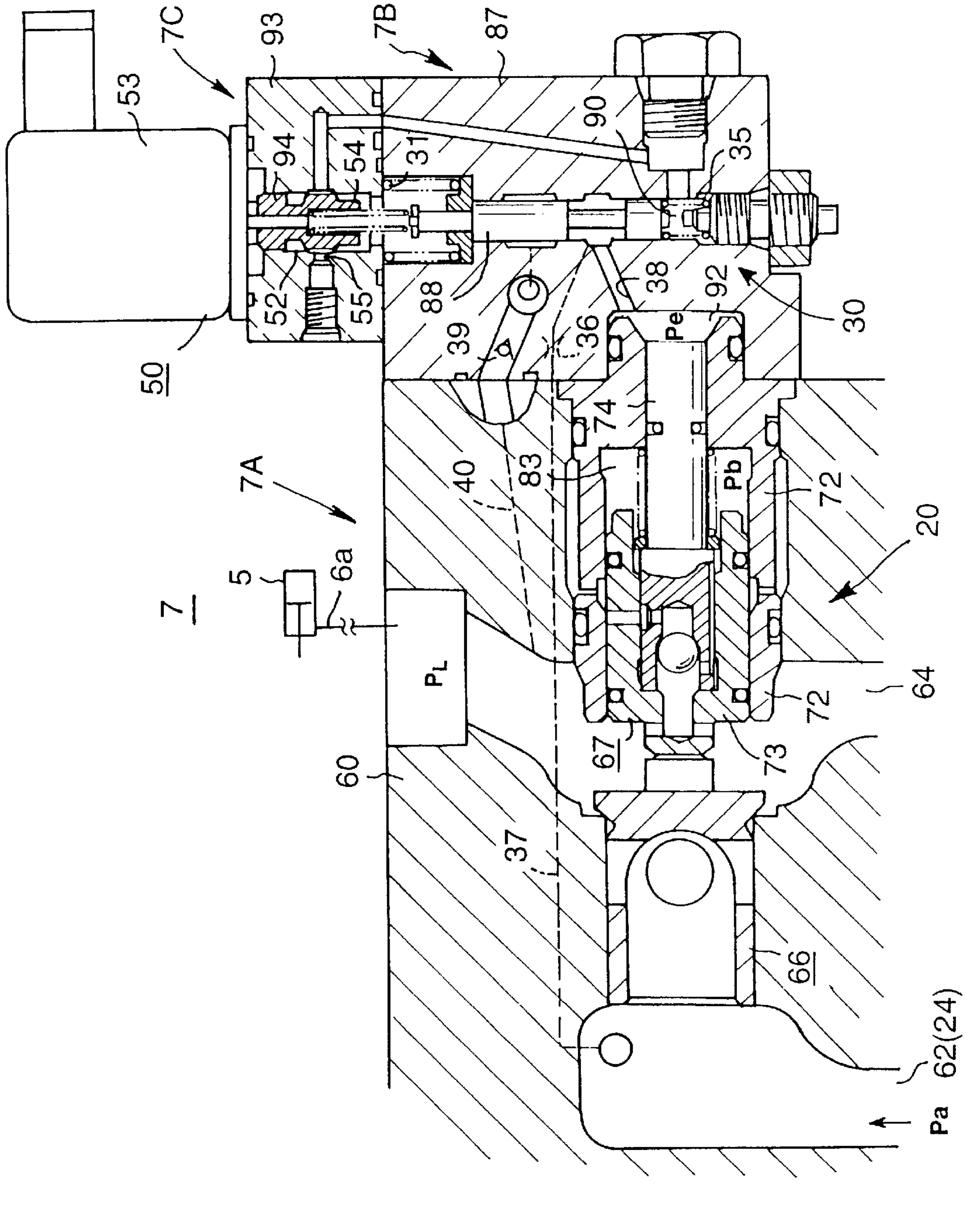
FIG. 5 is a longitudinal cross section, depicting the structure of another pressure compensating valve relating to the present invention.

FIG. 5 depicts a second example of the structure of a pressure compensating valve 7. This pressure compensating valve 7 differs from the pressure compensating valve 7 in FIG. 4 in that the spring 54 of the electromagnetic proportional pressure control valve 50 is brought into contact with the top end of the spool 88 of the variable throttle valve 30 of the control pressure producing component 7B.

In this pressure compensating valve 7, when the spool 88 of the variable throttle valve 30 is operated based on the pilot pressure Pd supplied from the electromagnetic proportional pressure control valve 50, the operating force is mechanically fed back to the spool 94 of the electromagnetic proportional pressure control valve 50 through the spring 54.

The operating characteristics (response) of the spool 88 of the variable throttle valve 30 are improved, allowing high-precision pressure compensation to be achieved.

Figure 6:
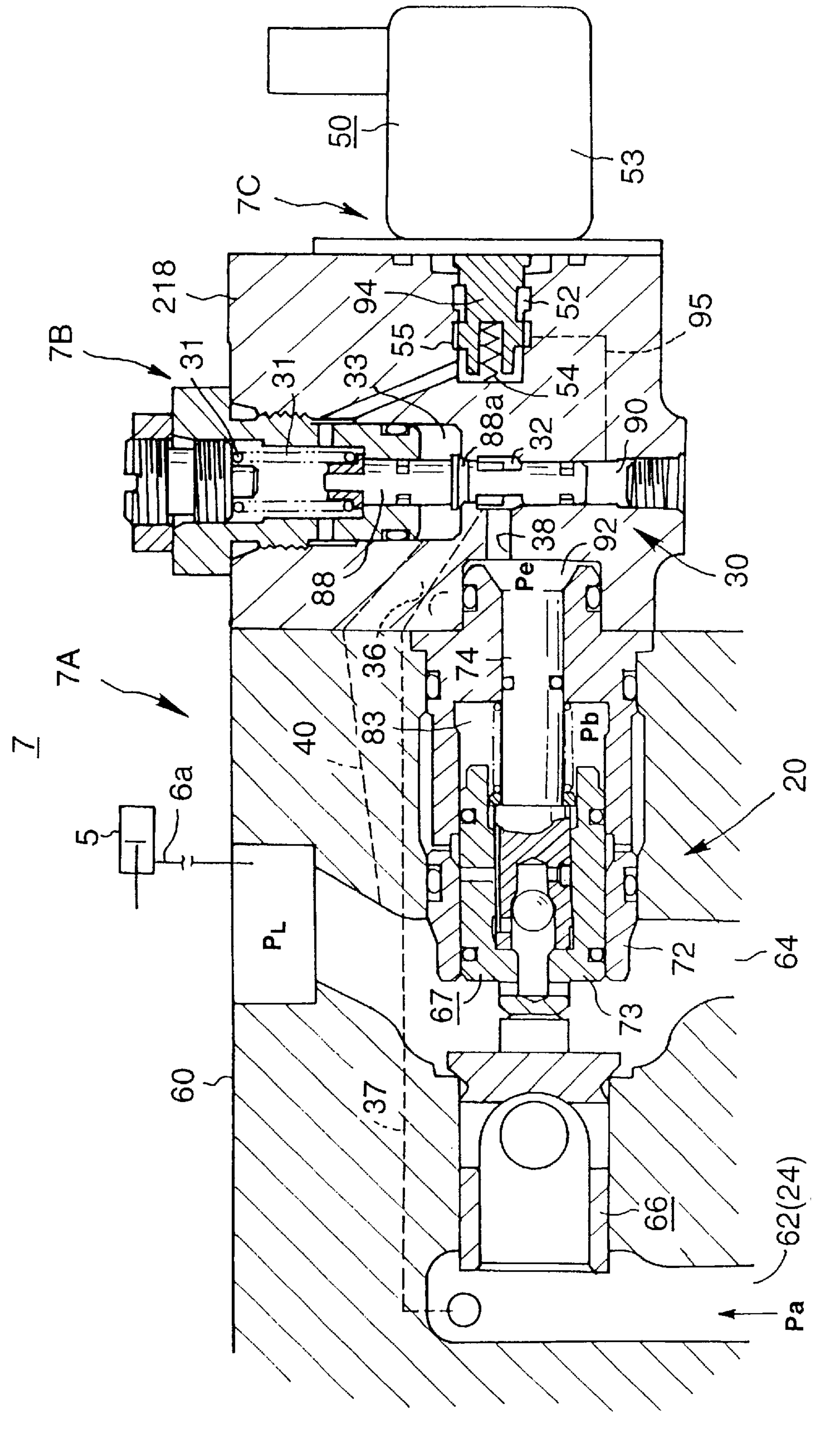
FIG. 6 is a longitudinal cross section, depicting the structure of another pressure compensating valve relating to the present invention.

FIG. 6 depicts a third example of the structure of the pressure compensating valve 7. This pressure compensating valve 7 is such that the variable throttle valve 30 of the control pressure producing component 7B and the electromagnetic proportional pressure control valve 50 have a shared body 218, with the solenoid 53 of the electromagnetic proportional pressure control valve 50 located on the exterior of the body 218. This allows the structure to be made more compact and the number of parts to be reduced.

Meanwhile, the control pressure producing component 7B in this pressure compensating valve 7 forms a flange *88a* having a tapered peripheral surface on the spool 88 of the variable throttle valve 30, and the flange *88a* is interposed between the inlet port 32 and outlet port 33 of the variable throttle valve 30.

When pressured oil with the pressure P1 flows through the oil passage 40 into the outlet port 33 of the variable throttle valve 30 by means of this structure, the top surface of the flange *88a* is placed under pressure by the pressured oil.

The spool 88 is thus moved down, and the tapered peripheral surface of the flange *88a* presses against the seat surface of the body 218, so that the inlet port 32 and outlet port 33 are blocked off from each other.

In this way, the spool 88 functions as a check valve to prevent the pressured oil with the pressure P1 from flowing toward the inlet port 32. The body 218 of this pressure compensating valve 7 thus does not require the check valve 39 depicted in FIGS. 4 and 5, making the body 218 easier to fabricate.

Figure 7:
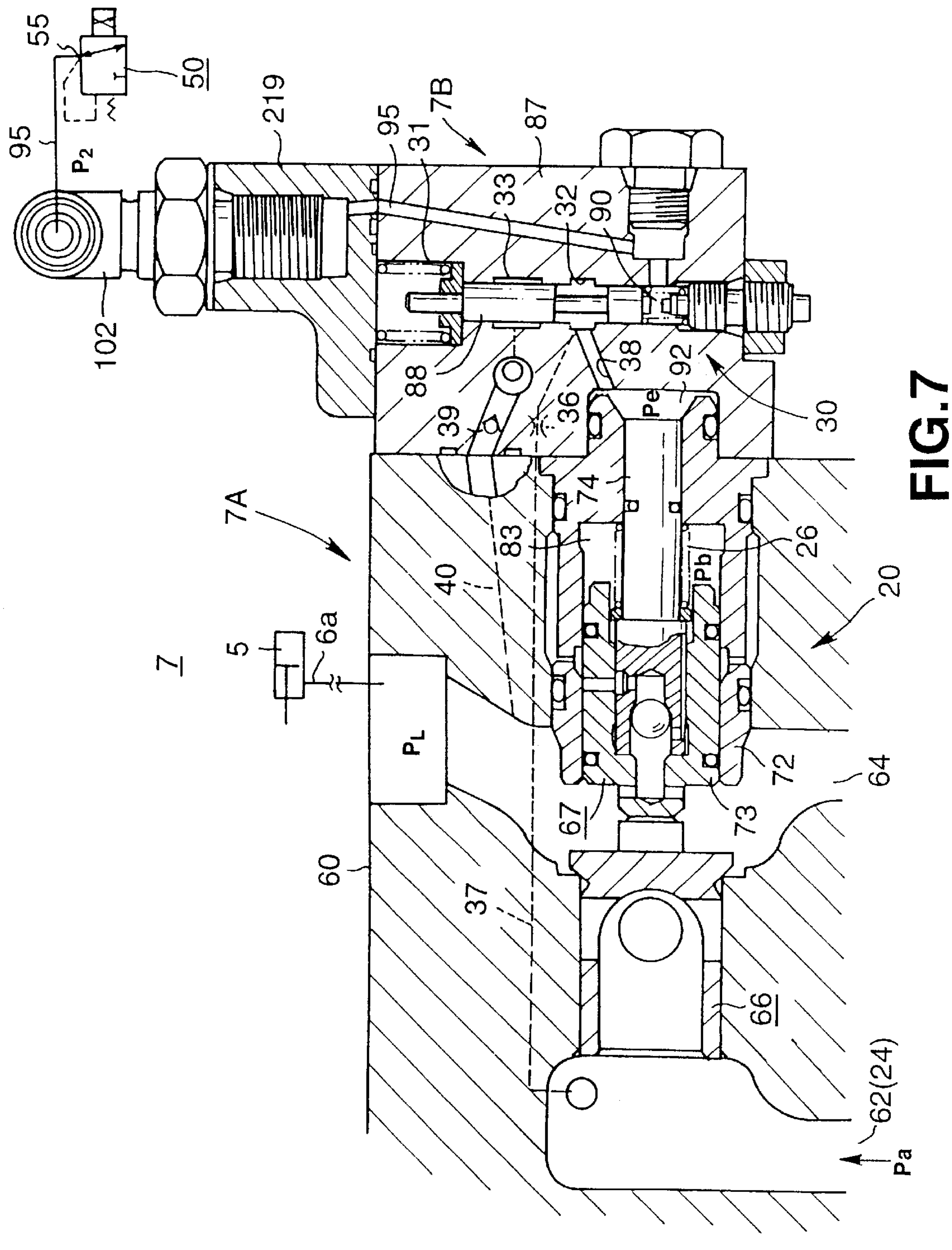
FIG. 7 is a longitudinal cross section, depicting the structure of another pressure compensating valve relating to the present invention.

FIG. 7 depicts a fourth example of the structure of the pressure compensating valve 7. This pressure compensating valve 7 has a structure in which a joint 102 is attached to an attachment block 219 secured to the top surface of the body 87 of the control pressure producing component 7B, and the pressure chamber 90 of the variable throttle valve 30 in the control pressure producing component 7B communicates through the joint 102 and piping 95 to the outlet port 55 of the electromagnetic proportional pressure control valve 50.

In this pressure compensating valve 7, the pilot pressure Pd output from the electromagnetic proportional pressure control valve 50 or the pilot pressure output from a manual pilot valve can be allowed to act on the variable throttle valve 30 of the control pressure producing component 7B by way of the joint 102. This pressure compensating valve 7 is thus suitable for use in cases where the electromagnetic proportional pressure control valve 50 or pilot valve must be located at a distance from the control pressure producing component 7B because of restricted space or the like.

The variable throttle valve 30 of the control pressure producing component 7B in this pressure compensating valve 7 has a structure similar to that of the variable throttle valve 30 of the pressure compensating valve 7 depicted in FIG. 4.

Figure 8:
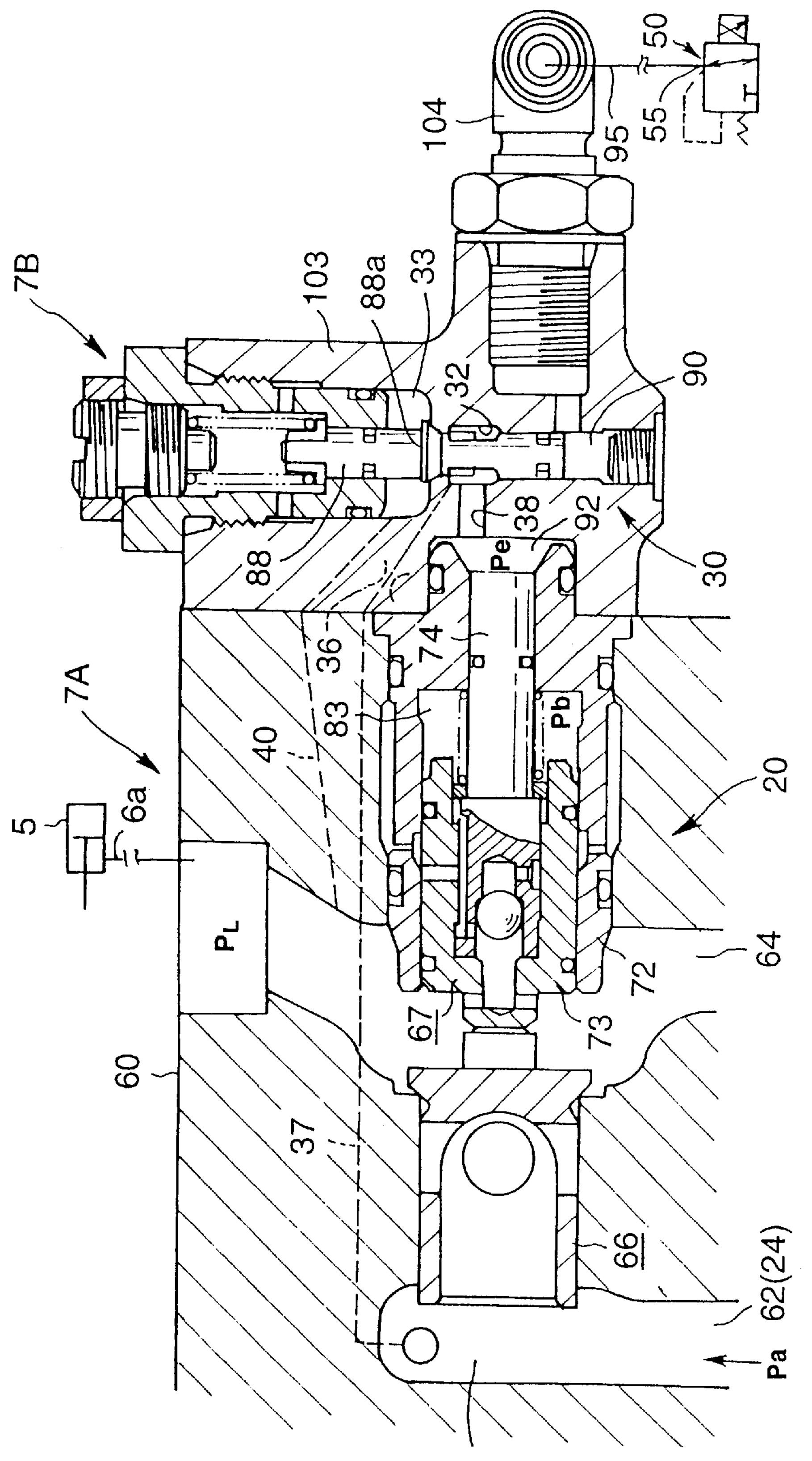
FIG. 8 is a longitudinal cross section, depicting the structure of another pressure compensating valve relating to the present invention.

FIG. 8 depicts a fifth example of the structure of the pressure compensating valve 7. This pressure compensating valve 7 has a structure in which a joint 104 is attached to the exterior of the body 103 of the control pressure producing component 7B, and the pressure chamber 90 located in the variable throttle valve 30 of the control pressure producing component 7B communicates through the joint 104 and piping 95 to the electromagnetic proportional pressure control valve 50 or a manual pilot valve not shown in the figure.

The electromagnetic proportional pressure control valve 50 or pilot valve of this pressure compensating valve 7 can be located apart from the control pressure producing component 7B. Since the joint 104 is located in the body 103 of the control pressure producing component 7B in this pressure compensating valve 7, the machine can be made more compact and the number of parts can be reduced.

The variable throttle valve 30 of the control pressure producing component 7B has a structure similar to that of the variable throttle valve 30 in the pressure compensating valve 7 depicted in FIG. 6. The body 103 of the control pressure producing component 7B in this pressure compensating valve 7 thus requires no check valve in a manner similar to that in the pressure compensating valve 7 depicted in FIG. 6.

Figure 9:
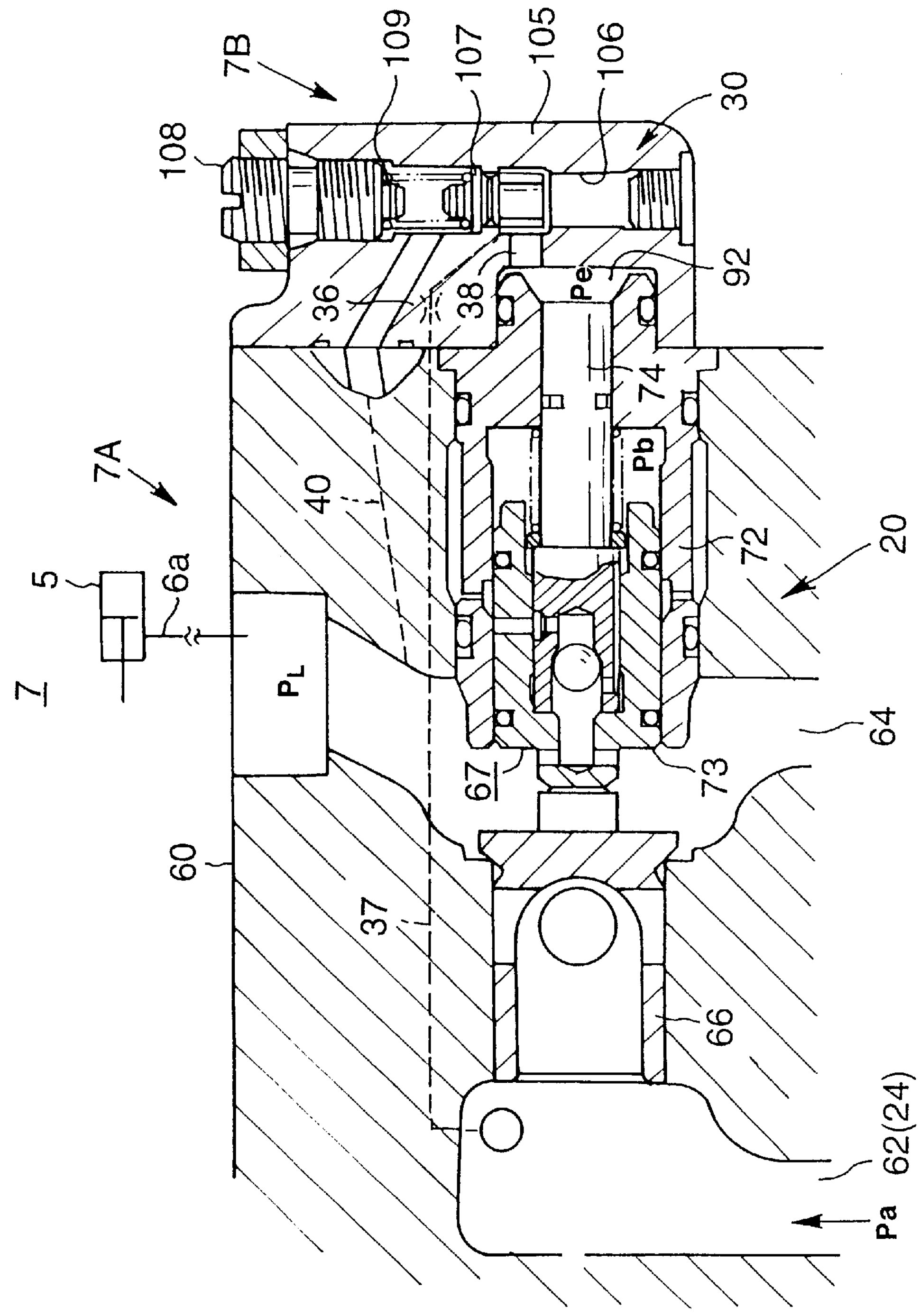
FIG. 9 is a longitudinal cross section, depicting the structure of another pressure compensating valve relating to the present invention.

FIG. 9 depicts a sixth example of the structure of the pressure compensating valve 7. This pressure compensating valve 7 is composed of only the compensator 7A and the control pressure producing component 7B. The compensator 7A has a structure similar to that of the compensator 7A depicted in FIG. 4.

The control pressure producing component 7B is equipped with a variable throttle valve 30 having a structure allowing the magnitude of the throttling to be manually altered. This variable throttle valve 30 has a vertical hole 106 in the body 105, and a poppet type spool 107 is inserted into this vertical hole 106. The top and bottom of the vertical hole 106 can be rendered communicable and are blocked by the vertical movement of the spool 107.

The top of a vertical hole 106 communicates through the oil passage 40 to the actuator port 64 of the operating valve 4. The bottom of the vertical hole 106 communicates through the oil passage 37 equipped with the throttle 36 to the outlet port 62 of the operating valve 4, and also communicates through the oil passage 38 to the pressure chamber 92.

An adjusting screw 108 is threaded into the top of the vertical hole 106, and a spring 109 with weak elastic force is interposed between the adjusting screw 108 and the spool 107.

In the variable throttle valve 30 constructed in this manner, the pressured oil with the pressure Pa discharged from the outlet port 62 of the operating valve 4 flows through the oil passage 37 into the bottom of the vertical hole 106.

With this, the spool 107 is pushed up, and part of the pressured oil with the pressure Pa flows into the oil passage 40 while constricted by the spool 107. The pressure Pe of the pressure chamber 92 is set according to the amount of pressured oil flowing into the oil passage 40, that is, according to the throttle level of the spool 107.

The upward moving stroke of the spool 107 defining the throttle level of the spool 107 can be adjusted by manually rotating the adjusting screw 108. The pressure compensating valve 7 can thus alter the pressure Pe, that is, can alter the pressure compensation characteristics, when the screw 108 is rotated.

Since the spool 107 is a poppet valve type, when pressured oil flows from the cylinder 5 into the oil passage 40, the spool 107 is pushed down, blocking off the top and bottom of the vertical hole 106 from each other. In other words, the spool 107 functions as a check valve.

Thus, with this pressure compensating valve 7, there is no need to provide the body 105 with the check valve 39 depicted in FIG. 4, making the body 105 easier to fabricate.

Figure 10:
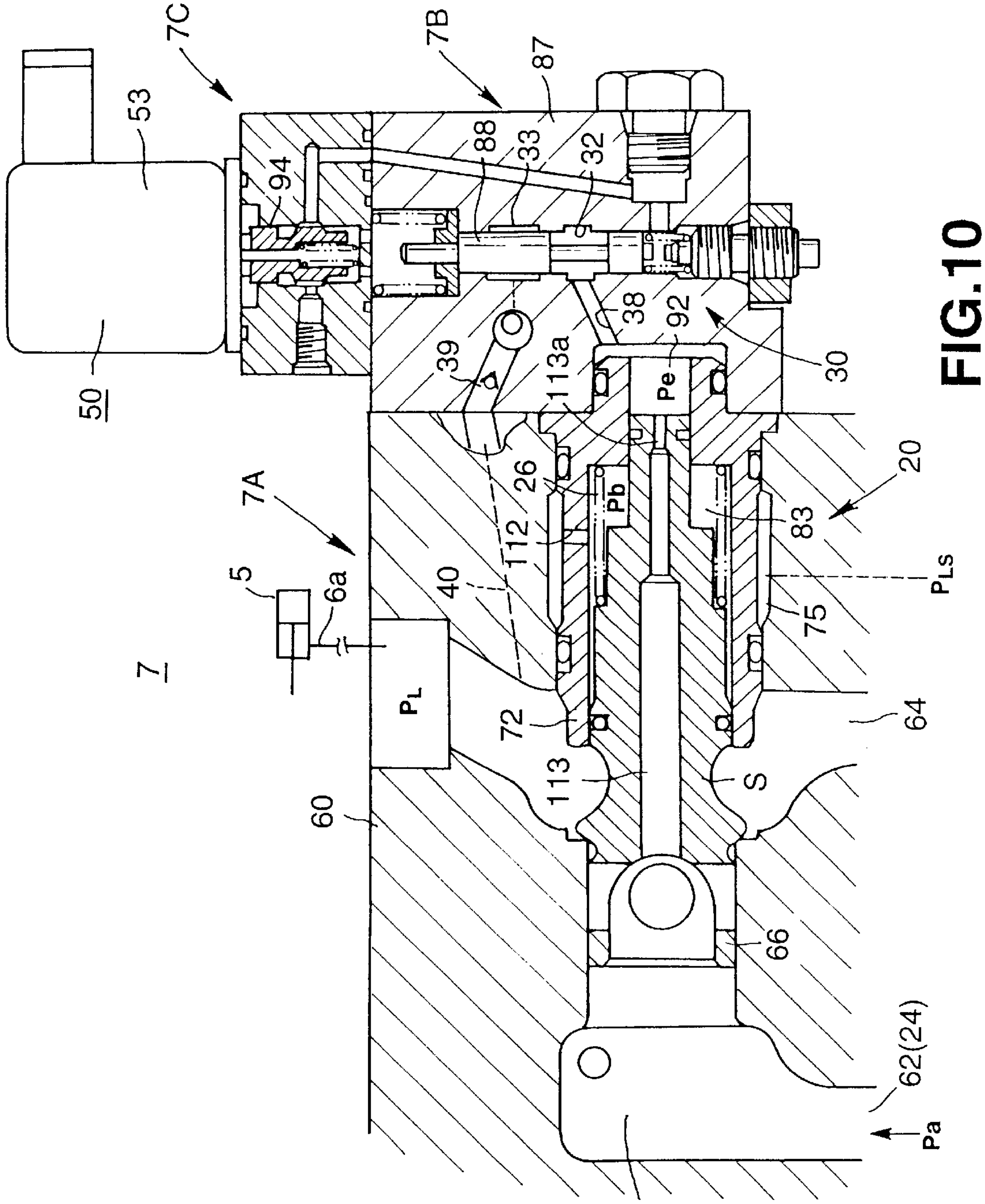
FIG. 10 is a longitudinal cross section, depicting the structure of another pressure compensating valve relating to the present invention.

FIG. 10 depicts a seventh example of the structure of the pressure compensating valve 7. This pressure compensating valve 7 differs from the pressure compensating valve 7 depicted in FIG. 4 in terms of the structure of the compensator 7A.

That is, the main valve 20 of the compensator 7A depicted in FIG. 10 has a spool S comprising the unification of the valve component 66 and pushing component 67 depicted in FIG. 4.

In this pressure compensating valve 7, the pressured oil with the maximum load pressure $P_{LS}$ flowing into the annular space 75 flows through a hole 112 located in the sleeve 72 directly into the pressure chamber 83, so the pressure Pb of the pressure chamber 83 results in the maximum load pressure $P_{LS}$.

The spool S forms a communication hole 113 along the central axis, thereby allowing the outlet port 62 of the operating valve 4 and the pressure chamber 92 to communicate with each other. As a result, the pressured oil with the pressure Pa flowing from the outlet port 62 of the operating valve 4 flows through the communicating hole 113 into the pressure chamber 92. In other words, the communicating hole 113 functions as the oil passage 37 in FIG. 4.

A fixed throttle 113*a* corresponding to the fixed throttle 36 depicted in FIG. 4 is formed at the end on the pressure chamber 92 side of the communication hole 113.

In the pressure compensating valve 7 having the aforementioned structure, there is no need to provide the body 60 of the compensator 7A with the oil passage 37 depicted in FIG. 4, nor is there any need to provide the body 87 of the control pressure producing component 7B with the throttle 36 depicted in FIG. 4. The bodies 60 and 87 are thus easier to fabricate.

The variable throttle valve 30 of the control pressure producing component 7B has a structure similar to that of the variable throttle valve 30 depicted in FIG. 4.

Figure 11:
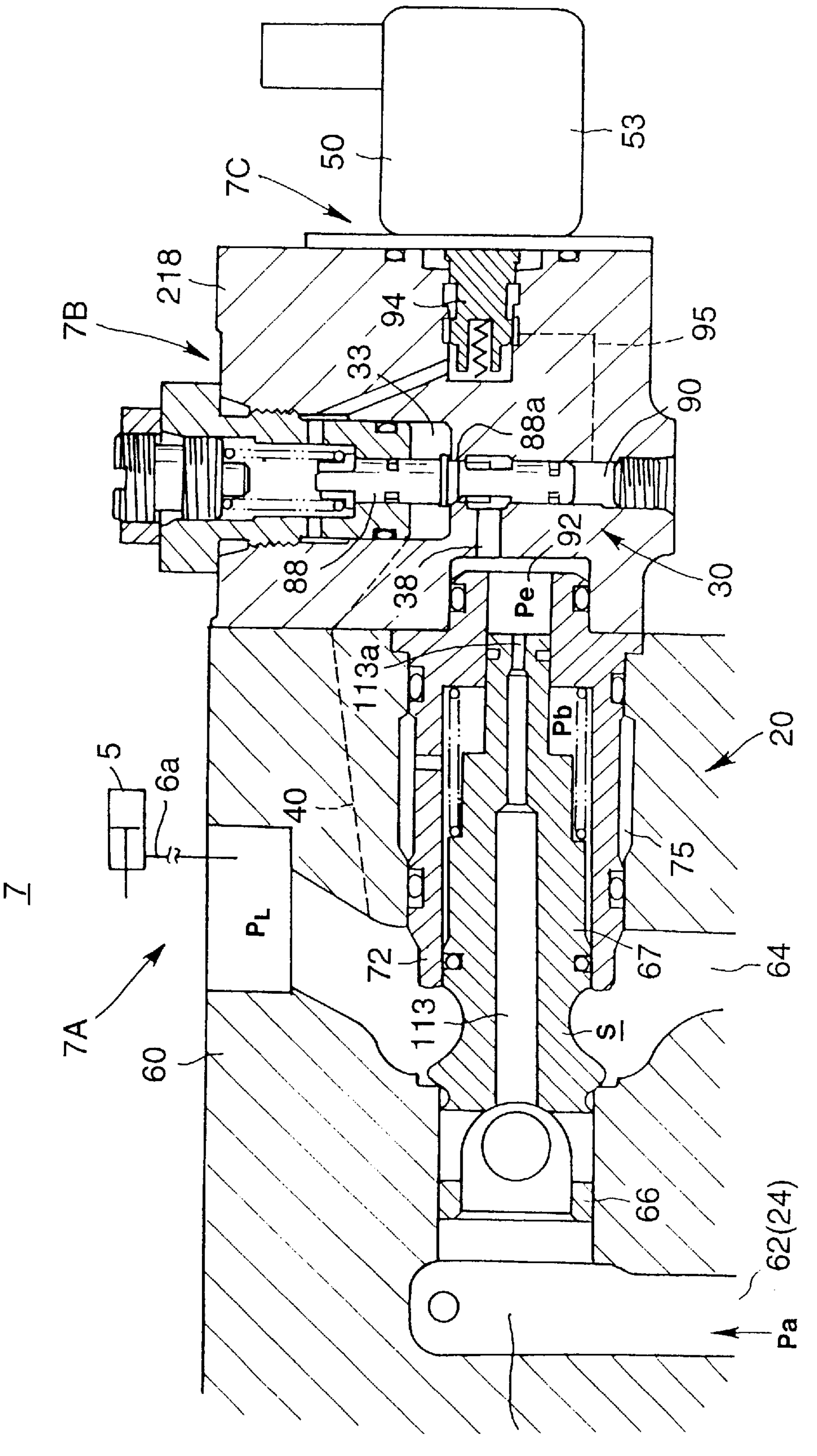
FIG. 11 is a longitudinal cross section, depicting the structure of another pressure compensating valve relating to the present invention.

FIG. 11 depicts an eighth example of the structure of the pressure compensating valve 7. The structure of the compensator 7A in this pressure compensating valve 7 is similar to that of the pressure compensating valve 7 depicted in FIG. 10, and the structures of the control pressure producing component 7B and pilot pressure producing component 7C are similar to those of the pressure compensating valve 7 depicted in FIG. 6.

Thus, in this pressure compensating valve 7, the same effects in making the body 60 and the body 218 easier to fabricate can be obtained as in the pressure compensating valve 7 depicted in FIG. 10, and the same effects in making a more compact machine, reducing the number of parts, and making it easier to fabricate the body 100 can be obtained as in the pressure compensating valve 7 depicted in FIG. 6.

Figure 12:
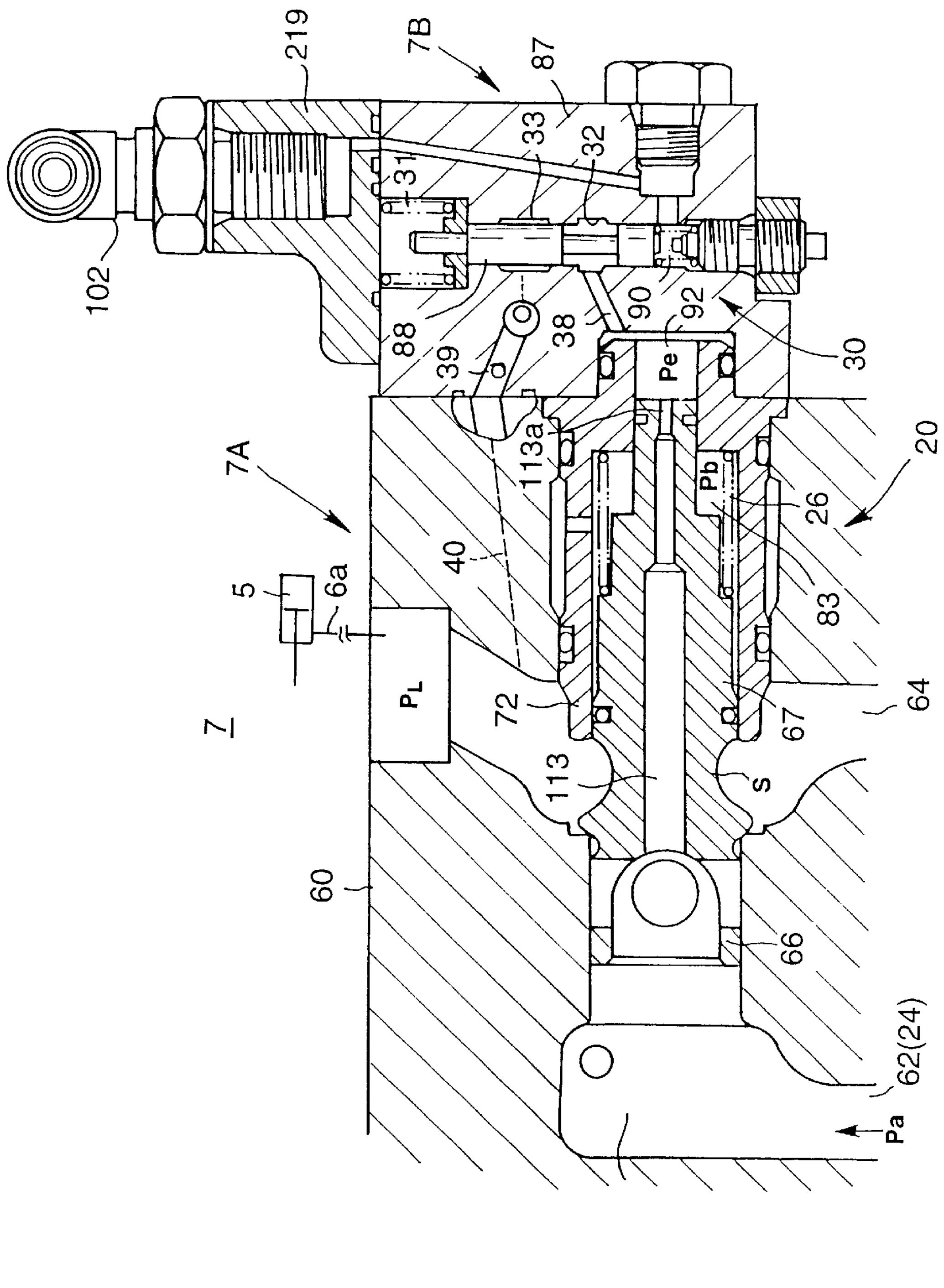
FIG. 12 is a longitudinal cross section, depicting the structure of another pressure compensating valve relating to the present invention.

FIG. 12 depicts a ninth example of the structure of the pressure compensating valve 7. The structure of the compensator 7A in this pressure compensating valve 7 is the same as that of the pressure compensating valve 7 depicted in FIG. 10, while the structure of the control pressure producing component 7B and the location for attaching the joint 102 are the same as that of the pressure compensating valve 7 depicted in FIG. 7.

In this pressure compensating valve 7, the same effects in making the bodies 60 and 87 easier to fabricate can be obtained as in the pressure compensating valve 7 depicted in FIG. 10, and the same effects in locating the electromagnetic proportional pressure control valve 50 apart from the control pressure producing component 7B can be obtained as in the pressure compensating valve 7 depicted in FIG. 7.

Figure 13:
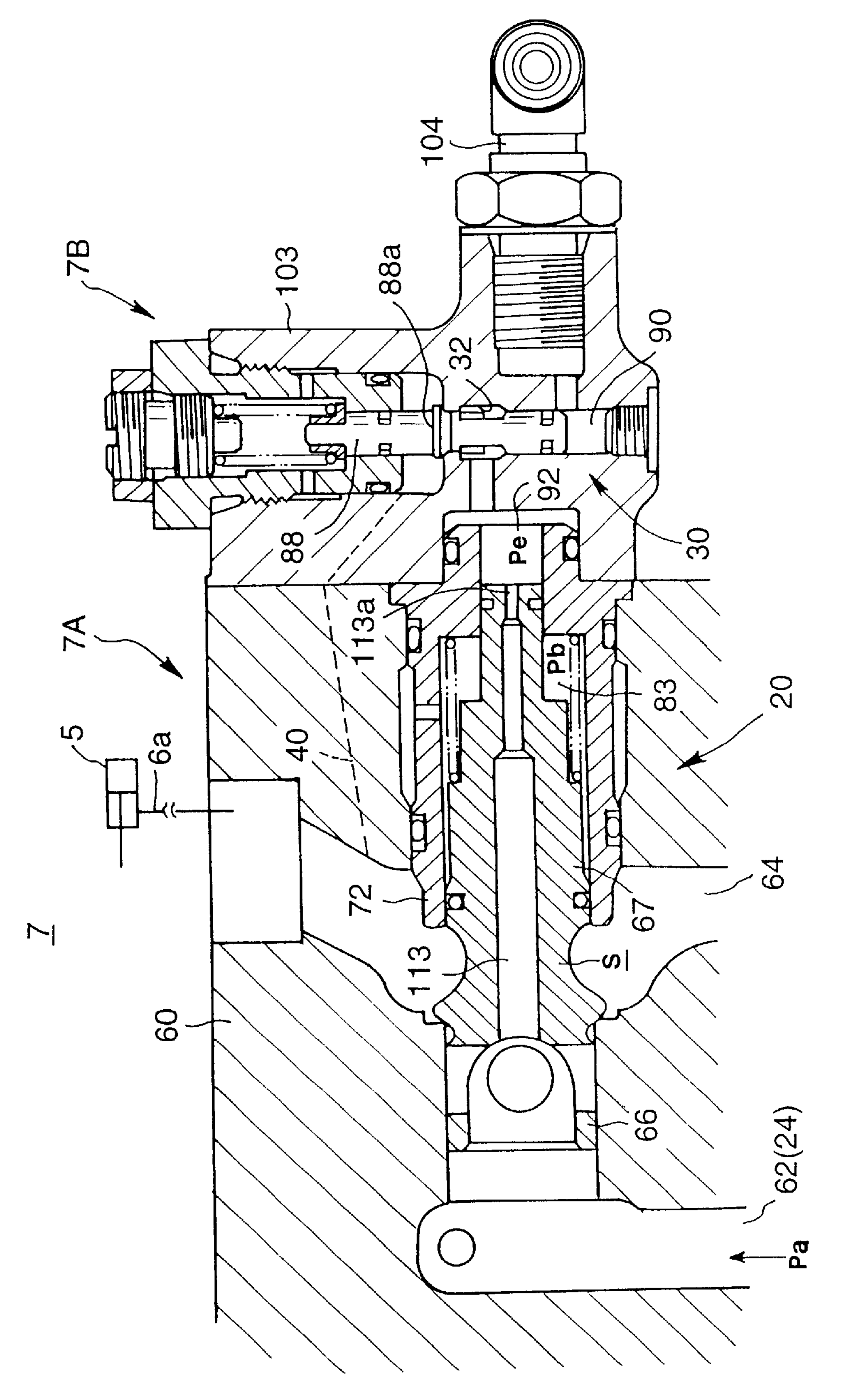
FIG. 13 is a longitudinal cross section, depicting the structure of another pressure compensating valve relating to the present invention.

FIG. 13 depicts a tenth example of the structure of the pressure compensating valve 7. The structure of the compensator 7A of this pressure compensating valve 7 is similar to that of the pressure compensating valve 7 depicted in FIG. 10, and the structure of the control pressure producing component 7B and the position for attaching the joint 140 are the same as in the pressure compensating valve 7 depicted in FIG. 8.

In this pressure compensating valve 7, the same effects in making it easier to fabricate the bodies 60 and 218 can be obtained as in the pressure compensating valve 7 depicted in FIG. 10, and the same effects in locating the electromagnetic proportional pressure control valve 50 apart from the control pressure producing component 7B can be obtained as in the pressure compensating valve 7 depicted in FIG. 8.

The variable throttle valve 30 of the control pressure producing component 7B has a structure similar to that of the variable throttle valve 30 in the pressure compensating valve 7 depicted in FIG. 6. The same effects in dispensing with the need to provide the body 103 of the control pressure producing component 7B with a check valve can be obtained as in the pressure compensating valve 7 depicted in FIG. 6.

Figure 14:
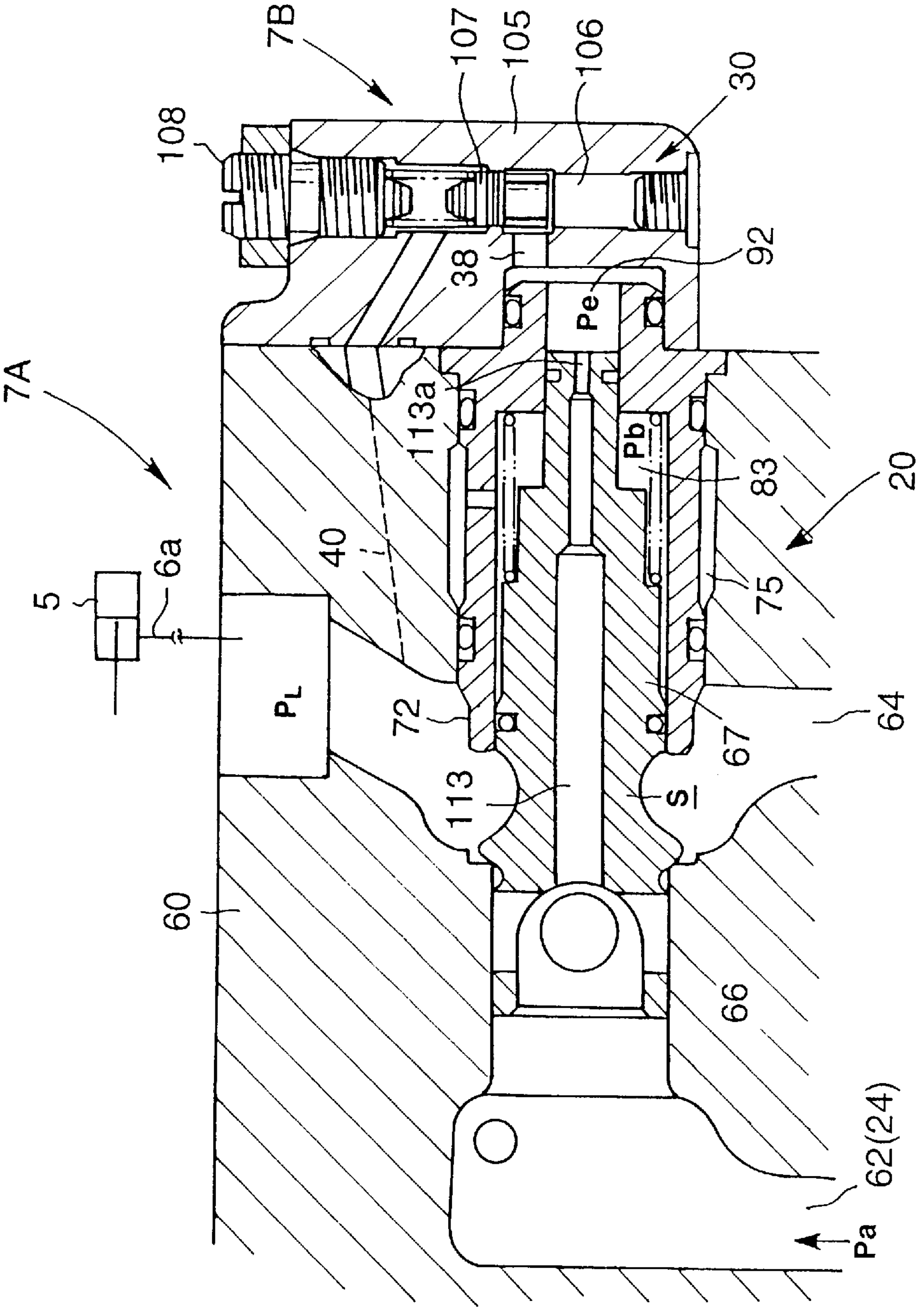
FIG. 14 is a longitudinal cross section, depicting the structure of another pressure compensating valve relating to the present invention.

FIG. 14 depicts an eleventh example of the structure of the pressure compensating valve 7. The structure of the compensator 7A of this pressure compensating valve 7 is similar to that of the pressure compensating valve 7 depicted in FIG. 10, and the structure of the control pressure producing component 7B is similar to that of the pressure compensating valve 7 depicted in FIG. 9.

In this pressure compensating valve 7, the same effects in making the bodies 60 and 105 easier to fabricate are obtained as in the pressure compensating valve 7 depicted in FIG. 10. The same effects in being able to manually adjust the throttle level and making the body 105 easier to fabricate can be obtained as in the pressure compensating valve 7 depicted in FIG. 9.

Figure 15:
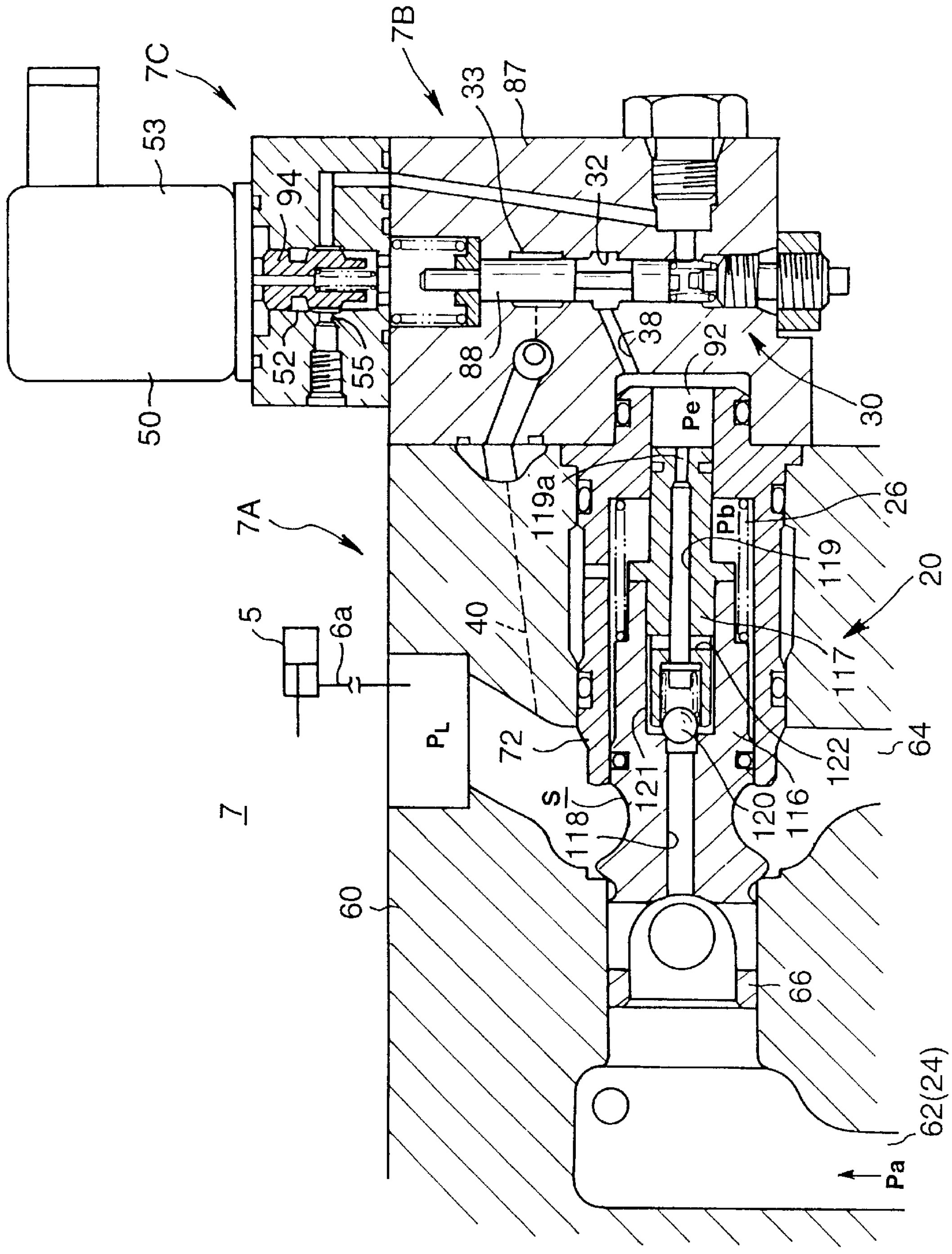
FIG. 15 is a longitudinal cross section, depicting the structure of another pressure compensating valve relating to the present invention.

FIG. 15 depicts a twelfth example of the structure of the pressure compensating valve 7. The structure of the compensator 7A of this pressure compensating valve 7 differs from that of the pressure compensating valve 7A depicted in FIG. 4.

The spool S of the main valve 20 of the compensator 7A depicted in FIG. 15 is equipped with a piston 116 featuring the unification of the valve component 66 and the piston 73 depicted in FIG. 4, and a sliding element 117 located in the piston 116.

The piston 116 and the sliding element 117 are located along the central axis through the communication holes 118 and 119, respectively. One end of the communication hole 119 in the sliding element 117 communicates through a check valve 120 to the communication hole 118 of the piston 116, and the other end communicates through a throttle 119*a* corresponding to the throttle 36 depicted in FIG. 2 to the pressure chamber 92.

In the pressure compensating valve 7 with the aforementioned structure, the pressured oil with the pressure Po supplied from the outlet port 62 flows into the pressure chamber 92 through the communication hole 118, a check valve 120, a slit 121 formed around the check valve 120, a port 122 passing through the peripheral wall of the sliding element 117, the communicating hole 119, and the throttle 119*a*. In other words, the communication holes 118 and 119 function as the oil passage 37 depicted in FIG. 2.

Accordingly, there is no need to provide the body 60 of the compensator 7A with the oil passage 37 depicted in FIG. 4, and there is no need to provide the body 87 of the control pressure producing component 7B with the throttle 36 depicted in FIG. 4. It is thus easier to fabricate the bodies 60 and 87.

Meanwhile, when the pressure P1 of the pressured oil in the actuator port 64 becomes greater than the pressure Po of the oil pressure in the outlet port 62, the check valve 120 closes. The pressured oil in the actuator port 64 is thus prevented by the check valve 120 from flowing into the outlet port 62.

The check valve 120 thus has the same function as the check valve 39 depicted in FIG. 2. Accordingly, in this pressure compensating valve 7, there is no need to provide the body 87 of the control pressure producing component 7B with the check valve 39 depicted in FIG. 4, which makes the body 87 easier to fabricate.

In the pressure compensating valves 7 described above, the oil passage 40 connected to the outlet port 33 of the variable throttle valve 30 was connected to the actuator port 64 (oil passage 6*a*) of the operating valve 4 depicted in FIG. 3, but this oil passage 40 may also be connected to the tank port 65.

The structure of the unloading pressure control valve 10 relating to the present invention is described below with reference to FIG. 16.

Figure 16:
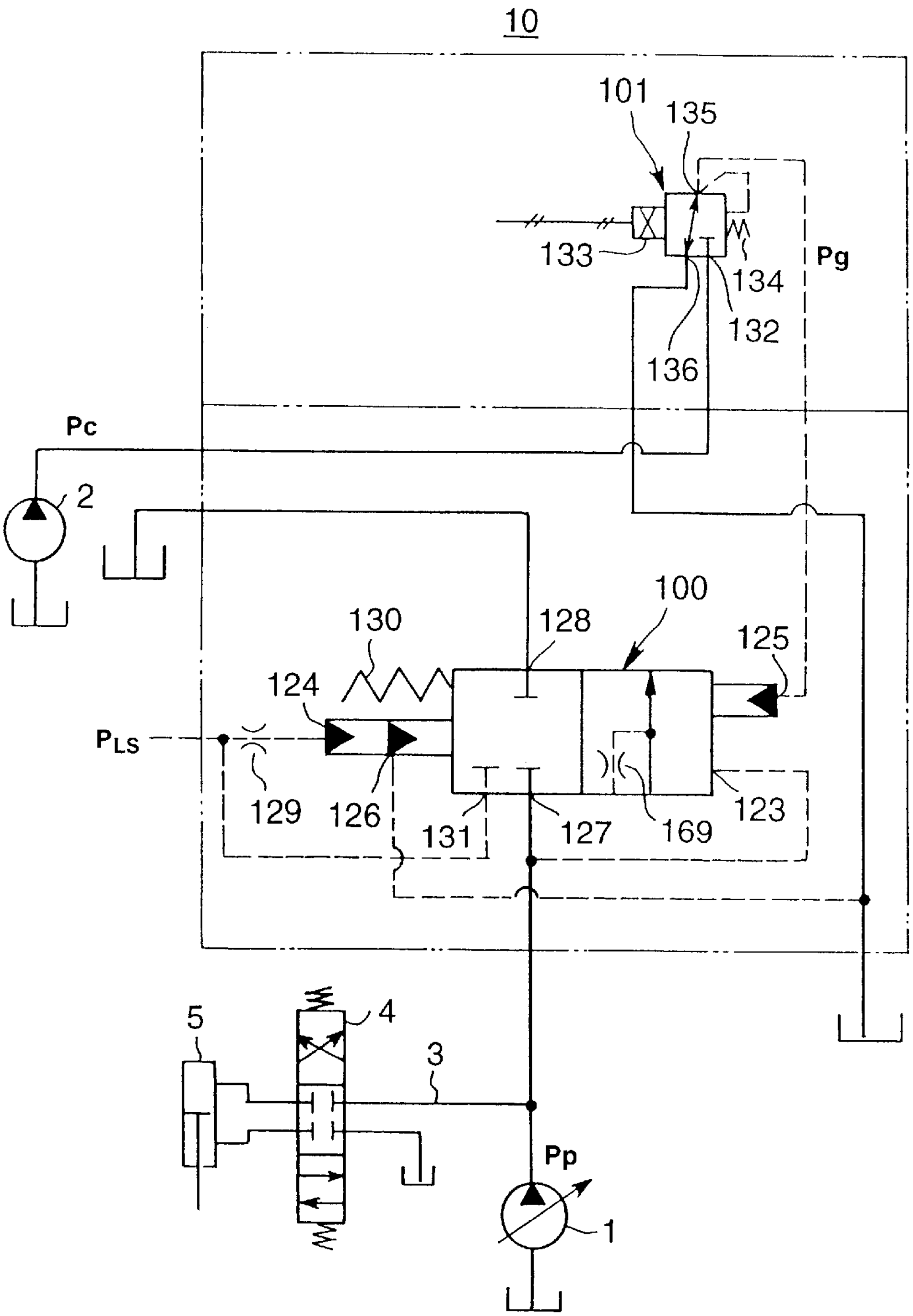
FIG. 16 is a circuit diagram of oil pressure, depicting the structure of an unloading pressure control valve relating to the present invention.

FIG. 16 is a circuit diagram of oil pressure, depicting the structure of the unloading pressure control valve 10. The unloading pressure control valve 10 is used to return the oil discharged from a hydraulic pump 1 directly to a tank to keep the hydraulic pump 1 in an unloaded state in a hydraulic system comprising, for example, a variable delivery pump 1, an auxiliary hydraulic pump (pilot hydraulic pump) 2, an operating valve 4 to which the oil discharged from the hydraulic pump 1 is supplied through an oil passage 3, and a hydraulic cylinder (hydraulic actuator) 5 located opposite the operating valve 4.

The unloading pressure control valve 10 comprises a main valve 100 and an electromagnetic proportional pressure control valve 101.

The main valve 100 has a first pressure receiving component 123, a second pressure receiving component 124, a third pressure receiving component 125, and a fourth pressure receiving component 126. The main valve 100 sets the throttle level (unloading start pressure) between a first inlet port 127 and outlet port 128 by means of the elastic force of a spring 130 and the pressure acting on the first pressure receiving component 123, second pressure receiving component 124, third pressure receiving component 125, and fourth pressure receiving component 126.

The first pressure receiving component 123 is connected to the variable delivery pump 1 along with the first inlet port 127, and receives the discharge pressure $P_P$ of the hydraulic pump 1. The second pressure receiving component 124 receives the maximum load pressure $P_{LS}$ by way of a throttle 129. The third pressure receiving component 125 receives the control pressure Pg described below. The fourth pressure receiving component 126 is connected to the tank. The main valve 100 determines the unloading set pressure by means of the elastic force of the spring 130 and the pressure area of the second pressure receiving component 124 and third pressure receiving component. The main valve 100 does not require the spring 130. In other words, the unloading start pressure can be set by just the difference between the pressure area of the second pressure receiving component 124 and the third pressure receiving component.

The control pressure Pg is given from the electromagnetic proportional pressure control valve 101. That is, the electromagnetic proportional pressure control valve 101 introduces the pressured oil discharged from an auxiliary hydraulic pump 2 through the inlet port 132, and the oil pressure resulting from a reduction in the pressure Pc of this pressured oil is output as the control pressure Pg. The control pressure Pg changes proportionally to the amount of electricity sent to the solenoid 133.

When zero electricity is supplied to the solenoid 133, the outlet port 135 communicates with the tank port 136 by means of the elastic force of a spring 134, as shown in the figure. The control pressure Pg acting on the third pressure receiving component 125 of the main valve 100 is thus zero.

The specific structure of the unloading pressure control valve 10 is described below with reference to FIG. 17.

A sliding element 145 is slidably inserted into the left side of the valve body 140 of the main valve 100, and the left end of a sleeve 148 is fitted to the right side of the valve body 140.

The sliding element 145 has a U-shaped cross section, and is brought into contact on the left end surface with an adjusting screw 147 threaded into the left end of the valve body 140. The adjusting screw 147 is locked by a lock nut

148. The interior of the sliding element 145 communicates through a hole 145*a* to the tank.

A spool 150 has a first small diameter component 151 forming a left half, a large diameter component 152 forming a central component, and a second small diameter component 153 forming a right half. The left tip of the first small diameter component 151 of the spool 150 is slidably inserted into the sliding element 145. The large diameter component 152 is slidably inserted into a large diameter hole 154 in a sleeve 146. The second small diameter component 153 is slidably inserted into a small diameter hole 155 in the sleeve 146.

The right end surface 150*a* of the spool 150 forms the first pressure receiving component 123 depicted in FIG. 16. The left end surface 150*b* of the spool 150 forms the fourth pressure receiving component 126.

The spool 150 is designed so that the cross sectional area of the second small diameter component 153 is a size equal to that obtained by subtracting the cross sectional area of the first small diameter component 151 from the cross sectional area of the large diameter component 152.

The right end of the sleeve 146 is positioned in the valve body 180 of the operating valve 4. The sleeve 146 forms the first inlet port 127 depicted in FIG. 16 by opening the right end. The inlet port 127 communicates with the pump port 181 of the operating valve 4.

Meanwhile, the sleeve 146 forms the outlet port 128 depicted in FIG. 16 at a position located slightly to the left of the right end opening. The outlet port 128 communicates with the tank port 182 of the operating valve 4.

The sleeve 146 further comprises a load pressure introduction port 157 and a control pressure introduction port 158. The load pressure introduction port 157 introduces pressured oil with the maximum load pressure $P_{LS}$. The control pressure introduction port 158 introduces control pressure Pg through the electromagnetic proportional pressure control valve 101.

The load pressure introduction port 157 communicates through an annular space 159, an oil hole 160, and a fine hole 161 to a spring chamber 162. The annular space 159 is formed between the inner peripheral surface of the sleeve 146 and the outer peripheral surface of the second small diameter component 153 of the spool 150. The oil hole 60 is formed along the central axis of the spool 150. The fine hole 161 passes diametrically through the spool 150, forming the throttle 129 depicted in FIG. 16.

Meanwhile, the control pressure introduction port 158 communicates with a space 163 formed between the large diameter component 152 of the spool 150 and the sleeve 146. The right end surface 152*a* of the spool large diameter component 152 located in the space 163 forms the third pressure receiving component 125 depicted in FIG. 16.

The spring 130 depicted in FIG. 16 is located in the spring chamber 162. The spring 130 is interposed between a spring receiver 162*a* inserted into the first small diameter component 151 of the spool 150 and the right end surface of the sliding element 145, and pushes the spool 150 to the right.

While the spring receiver 162*a* is in contact with the left end of the sleeve 146 in the state depicted in the figure, the first inlet port 127 and outlet port 128 are blocked off from each other by the right end of the spool 150. The left end surface 152*b* of the spool large diameter component 152 facing the spring chamber 162 forms the elastic force creating component of the spring 130 as well as the second pressure receiving component 124 depicted in FIG. 16.

The electromagnetic proportional pressure control valve 101 of the unloading pressure control valve 10 is described below.

The electromagnetic proportional pressure control valve 101 is disposed over the valve body 140 of the main valve 100. A spool 167 for allowing the inlet port 132 and outlet port 135 depicted in FIG. 16 to communicate with each other and to be blocked off from each other is located in the valve body 166 of the electromagnetic proportional pressure control valve 101. The top of the valve body 166 has a solenoid 133 that pushes the spool 167 down against the spring 134.

The inlet port 132 is connected to the auxiliary hydraulic pump 2. The outlet port 135 communicates through an oil passage 168 to the control pressure introduction port 158.

The operation of the unloading pressure control valve 10 having the aforementioned structure is described below.

When the discharge pressure $P_P$ of the hydraulic pump 1 acts on the right end surface 150*a* of the spool 150 which is the first pressure receiving component 123, the spool 150 is pushed to the left (the direction passing through the first inlet port 127 and outlet port 128).

Meanwhile, the control pressure Pg supplied from the electromagnetic proportional pressure control valve 101 acts on the right end surface 152*a* of the large diameter component of the spool 150 serving as the third pressure receiving component 125, by way of the oil passage 168 and the control pressure introduction port 158, so that the spool 150 is pushed to the left.

The spring 130 located in the spring chamber 162 pushes the spool 150 to the right. The load pressure $P_{LS}$ is introduced through the load pressure introduction port 157, annular space 159, oil hole 160, and fine hole 161 (throttle 129) into the spring chamber 162. The load pressure $P_{LS}$ thus acts on the left end surface 152*b* of the large diameter component of the spool 150 which is the second pressure receiving component 124, and the spool 150 is pushed to the right.

The balance of force determining the position of the spool 150 in the unloading pressure control valve 10 is represented by the following Eq. (3).

$$P_P \times A_1 = P_{LS} \times (A_2 - A_3) + F_0 - Pg \times (A_2 - A_1) \quad (3)$$

Where $A_1$: area of right end surface 150*a* of spool 150

$A_2$: area of large diameter component 152 of spool 150

$A_3$: area of left end surface 150*b* of spool 150

$F_0$: elastic force of spring 130

As noted above, the relation between area A1, A2, and A3 is A1=(A2−A3). Eq. (3) thus results in Eq. (4) below.

$$(P_P - P_{LS}) \times A_1 = F_0 - Pg \times (A_2 - A_1) \quad (4)$$

It is evident from the Eq. (4) that a constant pressure difference $P_P - P_{LS}$ is obtained irrespective of fluctuations in the load pressure $P_{LS}$ when the control pressure Pg is constant.

The pressure difference $P_P - P_{LS}$ determines the unloading start pressure. The unloading pressure control valve 10 thus allows the unloading start pressure to be arbitrarily set by controlling the amount of electricity to the solenoid 133 of the electromagnetic proportional pressure control valve 101 to change the control pressure Pg.

The main valve 100 of the unloading pressure control valve 10 is interposed between the hydraulic pump 1 and the tank. Thus, when the pressure difference $P_P - P_{LS}$ reaches the unloading start pressure, the oil discharged from the hydraulic pump 1 is returned to the tank during continuous operation.

When the operating valves 4 are operated in the center valve position, the pressure difference $P_P - P_{LS}$ increases to the unloading start pressure. With this, the oil discharged from the hydraulic pump 1 is returned through the unloading pressure control valve 10 to the tank, so the hydraulic pump 1 is in an unloaded state.

The electromagnetic proportional pressure control valve 101 of the unloading pressure control valve 10 produces pilot control pressure Pg resulting from the reduction of the discharge oil pressure Pc of the auxiliary hydraulic pump 2. Meanwhile, in the main valve 100, the operating start pressure (unloading start pressure) changes according to the control pressure Pg given by the electromagnetic proportional pressure control valve 101.

Thus, according to the unloading pressure control valve 10, control signals to the solenoid 133 of the electromagnetic proportional pressure control valve 101 can be changed to set the unloading start pressure to the desired magnitude.

Figure 18:
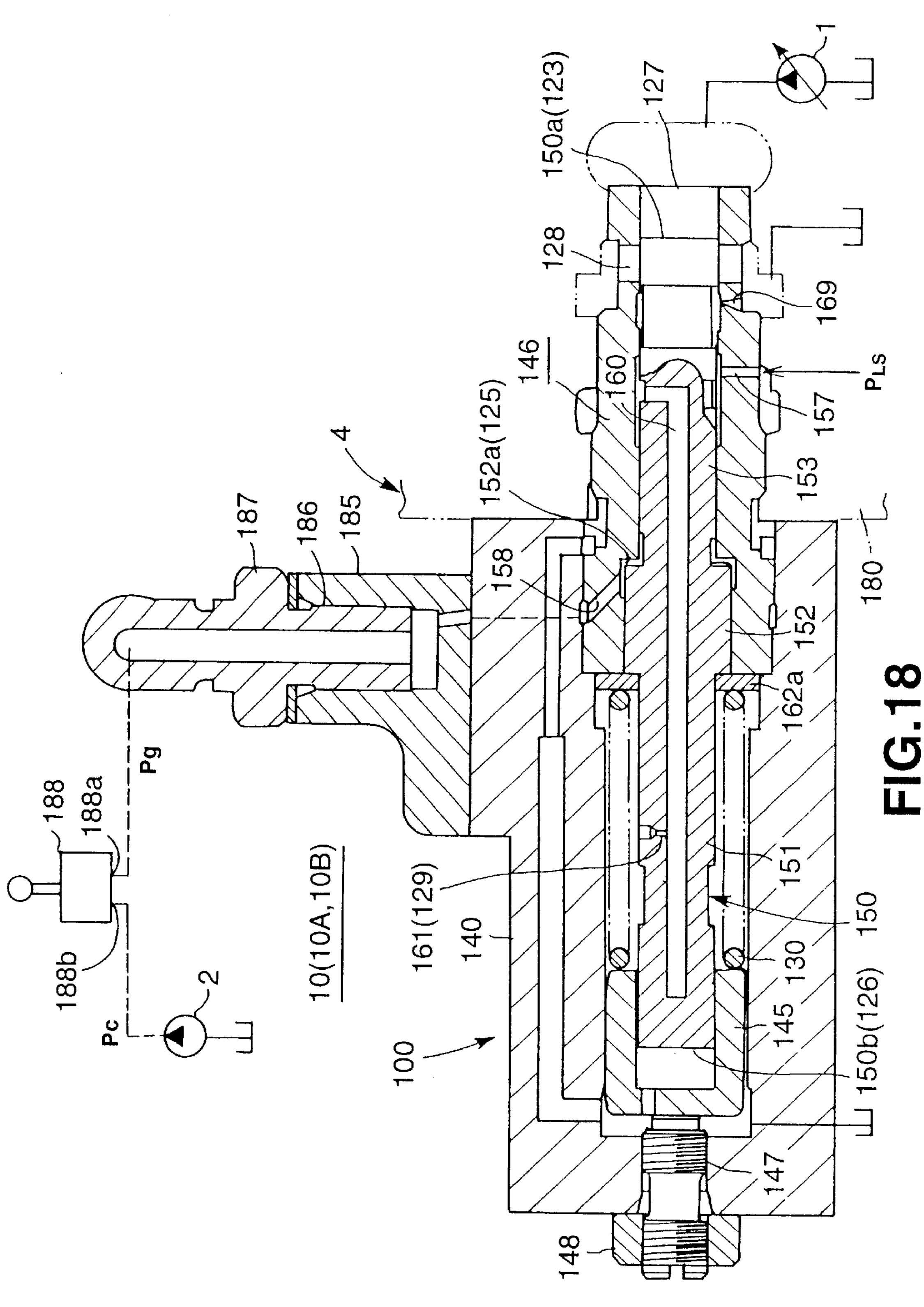
FIG. 18 is a cross section depicting another embodiment of an unloading pressure control valve relating to the present invention.

FIG. 18 depicts another embodiment of the unloading pressure control valve relating to the present invention.

This unloading pressure control valve 10 comprises an attachment block 185, a piping joint 187, and an oil pressure pilot valve 188. The attachment block 185 is fixed to the upper surface of the valve body 140. The piping joint 187 is screwed into a threaded hole 186 located in the attachment block 185, and is thus secured. The oil pressure pilot valve 188 is manually operated.

The threaded hole 186 passes through the control pressure introduction port 158. The inlet port 188*b* of the oil pressure pilot valve 188 is connected to the auxiliary hydraulic pump 2. The outlet port 188*a* is connected to the piping joint 187.

In this unloading pressure control valve 10, the pressured oil with the control pressure Pg supplied from the oil pressure pilot valve 188 acts on the right end surface 152*a* (third pressure receiving component 125) of the spool large diameter component 152 by way of the control pressure introduction port 158.

This unloading pressure control valve 10 allows the unloading start pressure to be arbitrarily set according to the control pressure Pg. The oil pressure pilot valve 188 which is the means for producing the control pressure Pg can also be disposed apart from the main valve 100. It can thus be freely disposed, enabling manual remote control of the unloading start pressure, and the like.

Figure 17:
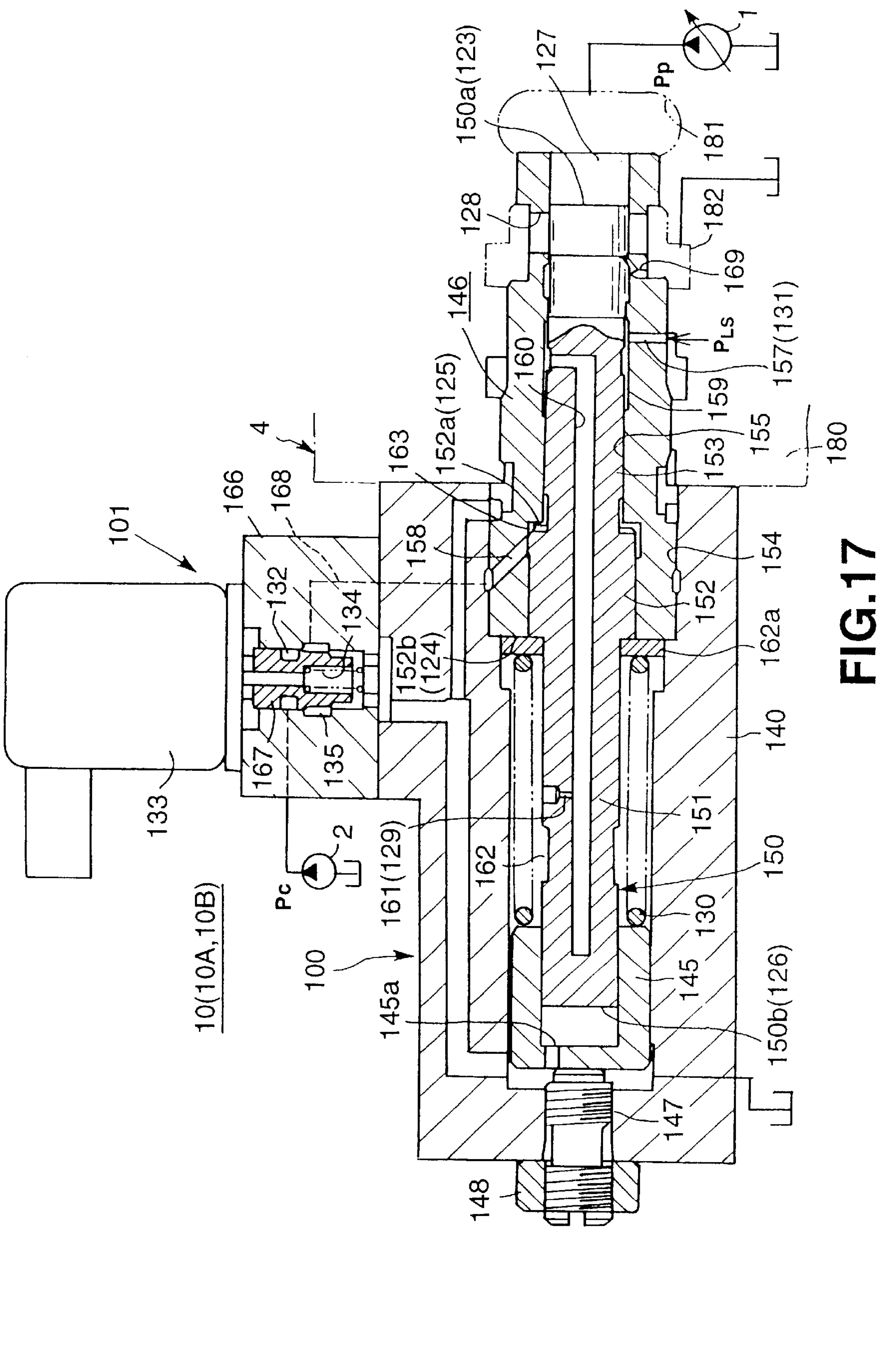
FIG. 17 is a cross section depicting a specific structure for an unloading pressure control valve relating to the present invention.

In the unloading pressure control valves 10 depicted in FIGS. 17 and 18, the control pressure Pg acted as the force moving the spool 150 to the left (the direction passing through the first inlet port 127 and outlet port 128 of the main valve 100).

In contrast to the above, it is also possible to allow the control pressure Pg to act as the force moving the spool 150 to the right. In this case, the pressing force of the spring 130 acts in the direction opposite that described above (the direction in which the spool is pushed to the left).

When the control pressure Pg is allowed to act in the opposite direction as described above, the unloading start pressure increases as the control pressure Pg increases.

Figure 19:
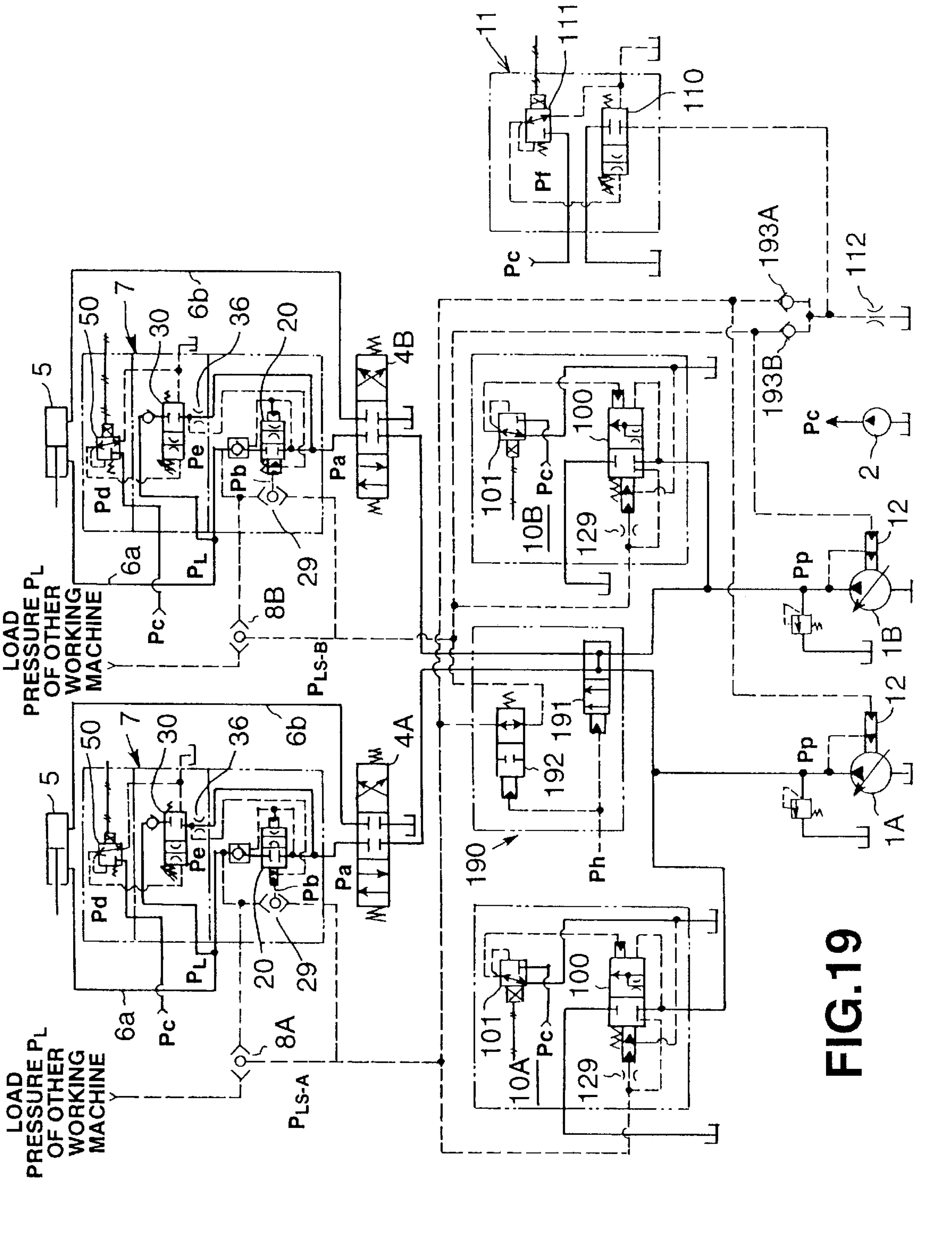
FIG. 19 is a circuit diagram of oil pressure in another hydraulic system involving the application of an unloading pressure control valve relating to the present invention.

FIG. 19 depicts a hydraulic system featuring the use of two hydraulic pumps 1A and 1B.

In this hydraulic system, the hydraulic pumps 1A and 1B are connected to corresponding operating valves 4A and 4B by means of a switching valve 191 in a converged flow component 190. A switching valve 192 switches between the communication and blockage of pressured oil, with a maximum load pressure $P_{LS\text{-}A}$ sensed by one shuttle valve 8A, and pressured oil with a maximum load pressure $P_{LS\text{-}B}$ sensed by another shuttle valve 8B.

The switching valves 191 and 192 of the converged flow component 190 are always simultaneously switched over by means of the pilot pressure Ph.

In the state depicted in the figure, the switching valves 191 and 192 of the converged flow component 190 in this case allow the oil discharged by the hydraulic pumps 1A and 1B to converge, and also allow the pressured oil with the load pressures $P_{LS\text{-}A}$ and $P_{LS\text{-}B}$ to converge.

Meanwhile, when the switching valves 191 and 192 of the converged flow component 190 are switched over by the pilot pressure Ph, the oil discharged by the hydraulic pumps 1A and 1B and that with the load pressures $P_{LS\text{-}A}$ and $P_{LS\text{-}B}$ are separated from each other, resulting in the independent operation of the unloading pressure control valves 10A and 10B.

The maximum load pressure $P_{LS\text{-}A}$ sensed by the shuttle valve 8A is the highest among the plurality of hydraulic cylinders 5 driven by the hydraulic pump 1A. The maximum load pressure $P_{LS\text{-}B}$ sensed by the shuttle valve 8B is the highest among the plurality of hydraulic cylinders 5 driven by the hydraulic pump 1B.

The load pressure $P_{LS\text{-}A}$ is supplied to the unloading pressure control valve 10 and the volume control component (pump discharge pressure control means) 12 of the hydraulic pump 1A. The load pressure $P_{LS\text{-}A}$ is also supplied through a check valve 193A to the load pressure bleed valve 11.

The load pressure $P_{LS\text{-}B}$ is supplied to the unloading pressure control valve 10 and the volume control component 12 of the hydraulic pump 1B. The load pressure $P_{LS\text{-}B}$ is also supplied through a check valve 193B to the load pressure bleed valve 11.

As described above, when the two pump circuits are separated, the switching valves 191 and 192 of the converged flow component 190 are switched to a blocking state.

However, even though the switching valves 191 and 192 are in a blocked state, minute amounts of oil leakage always occur. For example, when one operating valve 4A is in the center valve state, and the other operating valve 4B is in the operating state, the maximum load pressure $P_{LS\text{-}A}$ sensed by the shuttle valve 8A should be zero as long the switching valve 192 is operating in an ideal manner. In fact, however, the oil leakage from the switching valve 192 results in an increase in the maximum load pressure $P_{LS\text{-}A}$.

In this case, when the maximum load pressure $P_{LS\text{-}A}$ increases, the discharge pressure $P_P$ of the hydraulic pump 1A also increases, resulting in the maximum load pressure $P_{LS\text{-}A}$+pump set pressure.

The pressured oil with the maximum load pressure $P_{LS\text{-}A}$ is allowed to communicate with the tank during the operation of the one unloading pressure control valve 10A. That is, the pressured oil with the maximum load pressure $P_{LS\text{-}A}$ is introduced from in front of the throttle 129 through the branched piping into the unloading pressure control valve 10A, and this pressured oil is also output through a throttle 169 from the unloading pressure control valve 10A so as to be returned to the tank. This allows the maximum load pressure $P_{LS}$ confined in the piping leading from the shuttle valve 8A to the main valve 20 to escape to the tank, and prevents the discharge pressure $P_P$ of the hydraulic pump 1A from increasing. The discharge pressure $P_P$ of the hydraulic pump 1B can similarly be prevented from increasing during the operation of the other unloading pressure control valve 10B.

The structure of the variable bleed valve 11 relating to the present invention is described below with reference to FIG. 20.

Figure 20:
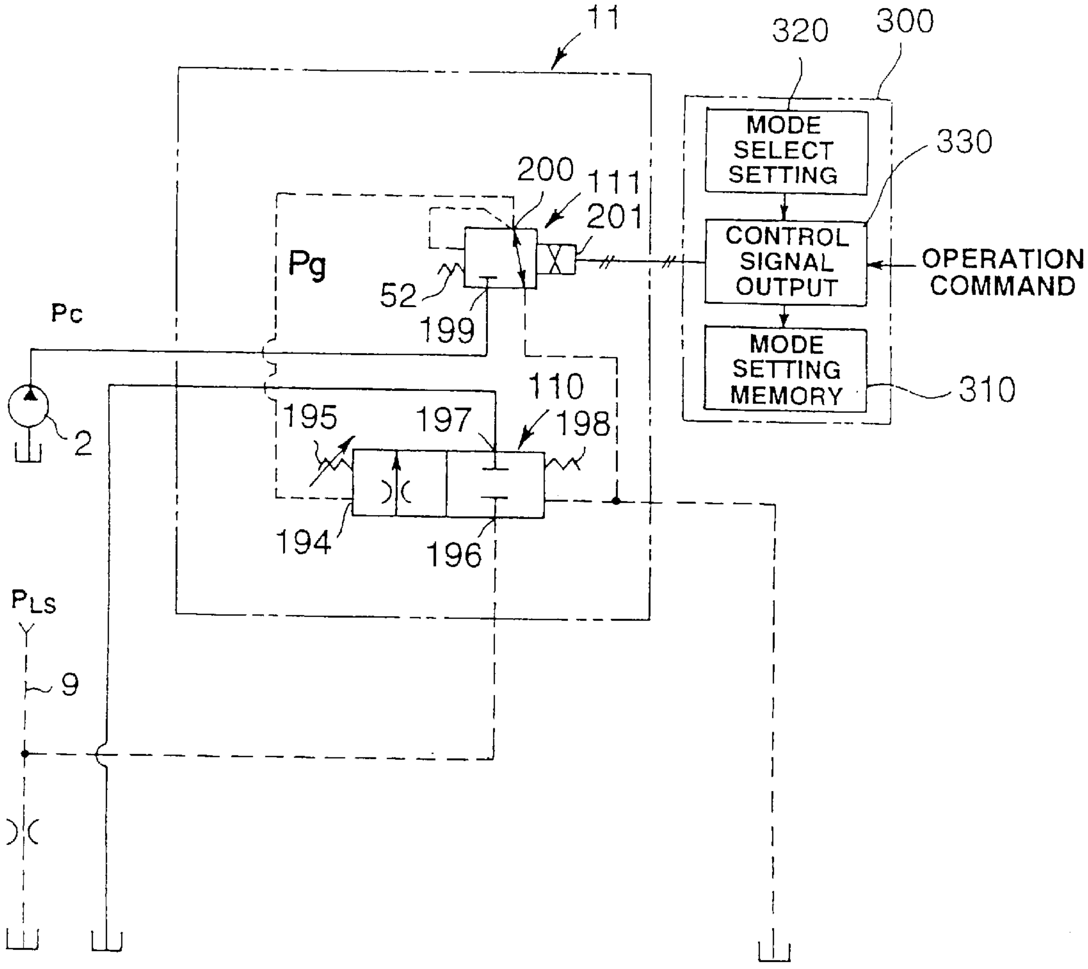
FIG. 20 is a circuit diagram of oil pressure, depicting an enlargement of the structure of a variable bleed valve used in the hydraulically operated device of FIG. 1.

The variable bleed valve 11 comprises a variable throttle valve 110 and an electromagnetic proportional pressure control valve 111, as shown in the enlargement in FIG. 20.

The variable throttle valve 110 is operated so as to increase the area of the opening between an inlet port 196 and an outlet port 197 by means of the elastic force of a spring 95 and the pilot pressure Pg acting on a pressure receiving component 194, and is operated so as to reduce the area of the opening by means of the elastic force of a spring 198.

The electromagnetic proportional pressure control valve 111 introduces pressured oil with a standard pressure Pc discharged from the auxiliary hydraulic pump 2 into the inlet port 199, and the pressure Pc of the pressured oil is reduced to the pilot pressure Pg. The pressured oil with the pilot pressure Pg is allowed to act on the pressure receiving component 194 of the variable throttle valve 110 by way of the outlet port 200. The pilot pressure Pg changes proportionally to the amount of electricity to the solenoid 201.

The variable bleed valve 11 is connected to a controller 300. The controller 300 gives a corresponding control signal to the solenoid 201 of the electromagnetic proportional pressure control valve 111 based on operation commands such as a command to open the operating valve 4 by the operation of an operating lever (not shown in figure).

Figure 21:
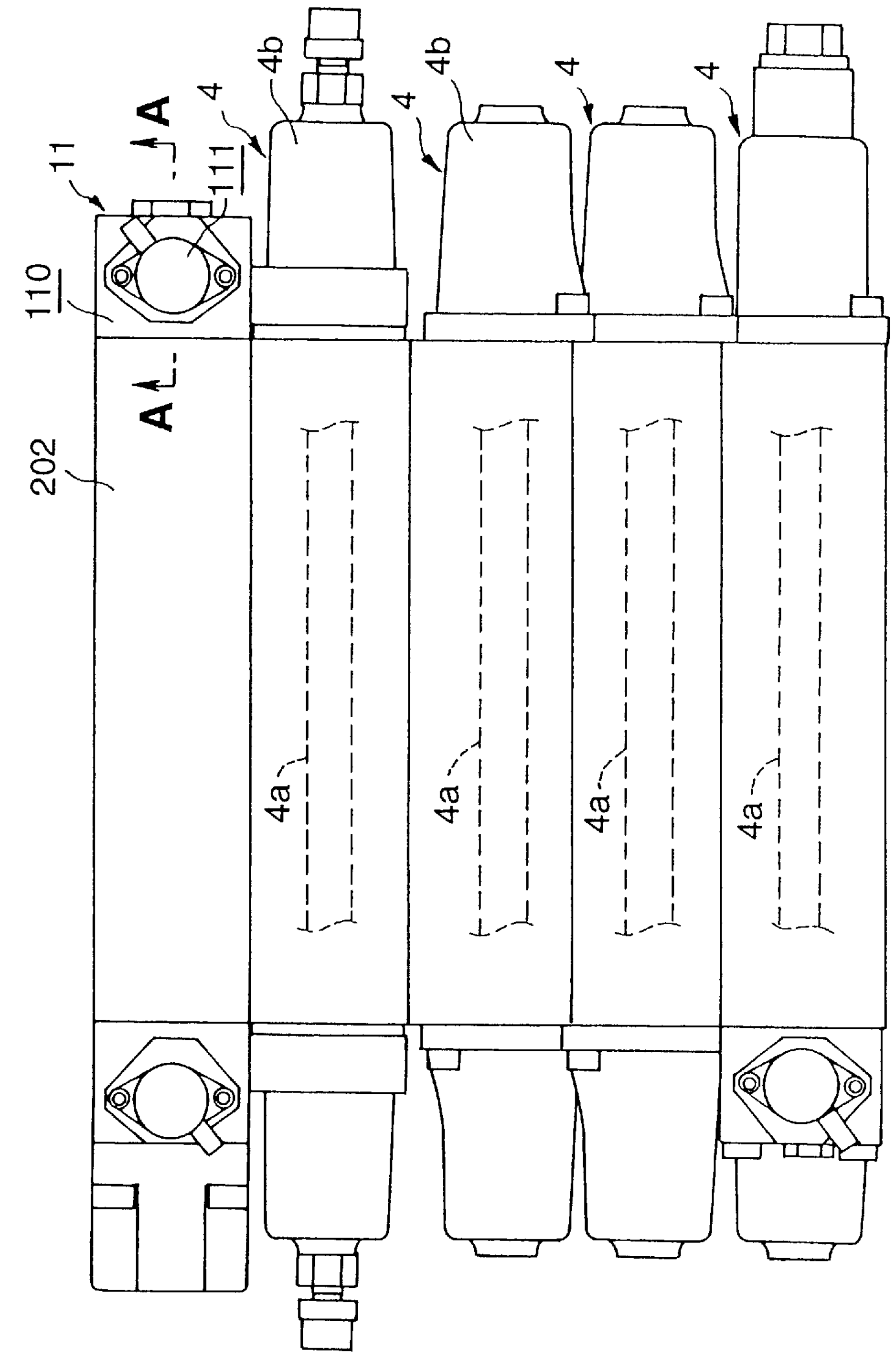
FIG. 21 depicts an embodiment with a variable bleed valve attached to the hydraulically operated device in FIG. 1.

FIG. 21 depicts the variable bleed valve 11 while mounted. It may also be seen from FIG. 21 that the variable bleed valve 11 is provided as a valve block along with a plurality of operating valves 4 and 4. That is, the variable bleed valve 11 is attached by means of a support block 202 to the operating valve 4 located on the outermost side of the plurality of operating valves 4 joined in parallel. The symbol 4*a* indicates the spool of the operating valve 4.

Figure 22:
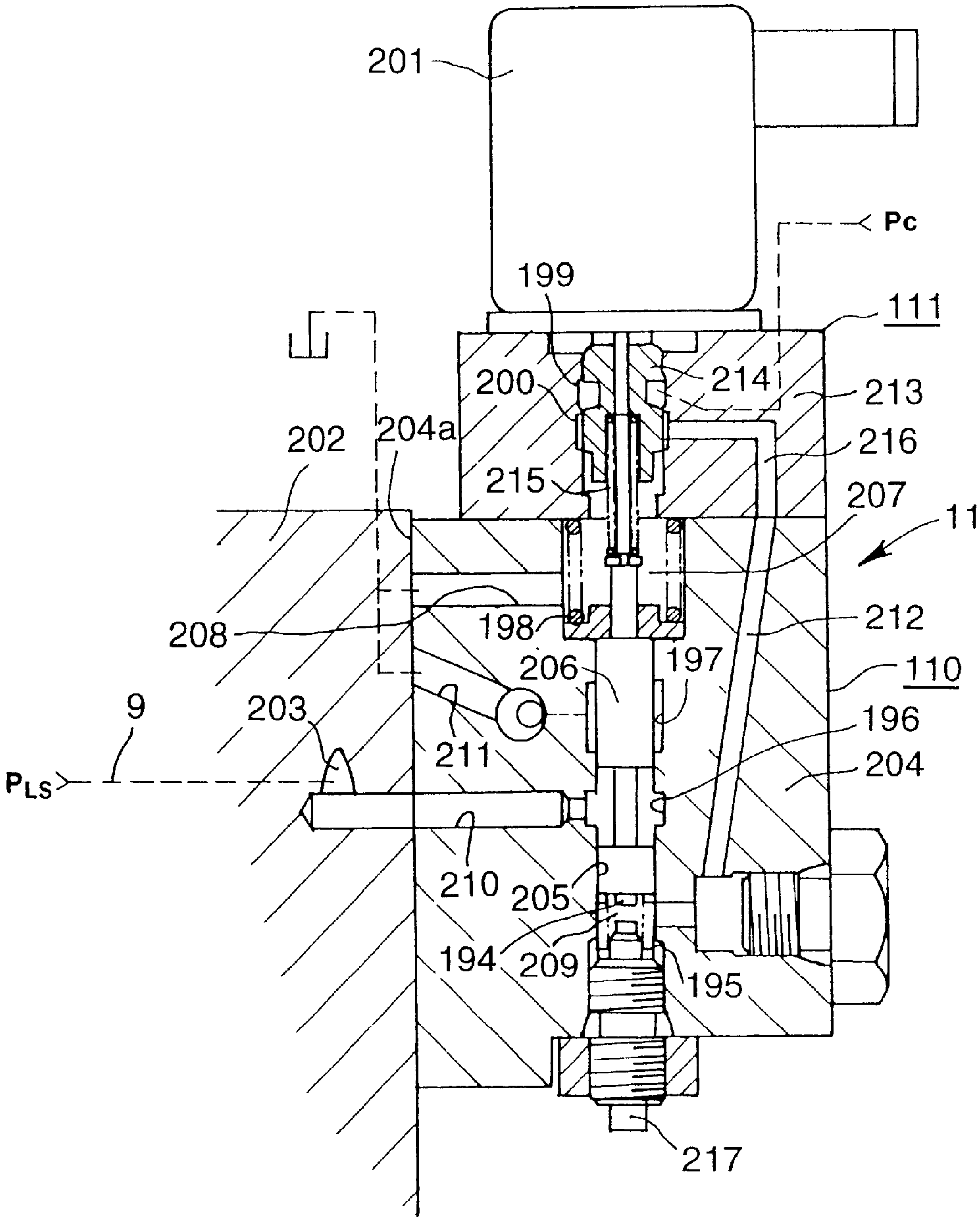
FIG. 22 is a cross section of line A—A in FIG. 21.

FIG. 22 is a cross section of line A—A in FIG. 21. It may be seen from FIG. 22 that the variable throttle valve 110 is such that the spool 206 is inserted into the spool hole 205 of the valve body 204. The spool hole 205 is formed in the vertical direction.

The spool 206 is interposed between the inlet port 196 and outlet port 197 of the variable throttle valve 110. The spool 206 is such that downward force (the direction in which the area of the opening between the ports 196 and 197 is reduced) is urged by the spring 215. Meanwhile, the upward force (the direction in which the area of the opening between the ports 196 and 197 is increased) is urged by the spring 195 in the pressure chamber 209 formed between the spool and an adjustment screw 62.

The bottom end surface of the spool 205 facing the pressure chamber 209 forms the pressure receiving component 194 depicted in FIG. 20. The elastic force of the spring 195 can be fine tuned by the operation of the adjustment screw 217.

The inlet port 196 communicates with the load pressure introduction hole 203 through a load pressure introduction oil passage 210 leading from the valve body 204 to the support block 202. The outlet port 197 communicates with the tank through a tank oil hole 211 that opens into the attachment surface 204 of the valve body 204.

The electromagnetic proportional pressure control valve 111 is disposed on the upper surface of the aforementioned valve body 204. The electromagnetic proportional pressure control valve 111 comprises a spool 214 and the solenoid 201. The spool 214 is vertically disposed in the valve body 213. The spool 214 is disposed coaxially relative to the spool 206 of the variable throttle valve 110. The solenoid 201 pushes the spool 214 down against the spring 215 according to the amount of electricity.

The spool 214 is constantly pushed upward by the elasticity of the spring 215. In this state, the inlet port 199 and outlet port 200 of the electromagnetic proportional pressure control valve 111 are blocked off from each other. The standard pressure Pc discharged by the auxiliary hydraulic pump 2 acts on the inlet port 199.

The outlet port 200 communicates with the pressure chamber 209 by way of an oil passage 216 located in the valve body 213 and an oil passage 212 located in the valve body 204 of the variable throttle valve 110. The spring 215 is in contact with the upper tip of the spool 206 of the variable throttle valve 110. Here, the spring chamber 207 of the valve body 204 communicates with the tank by way of a tank oil hole 208 that opens into the attachment surface 204*a* of the valve body 204.

The operation of the variable bleed valve 11 is described below.

Pressured oil present in the oil passage 9 gradually flows through the fixed throttle 112 into the tank when the operating valves 4 are operated in the center valve position. The maximum load pressure $P_{LS}$ acting on the discharge pressure control means 12 thus gradually decreases. When the maximum load pressure $P_{LS}$ decreases to zero, the displacement volume of the hydraulic pump 1 is reduced to the minimum preset volume by the pump discharge pressure control means 12.

When the operating valve 4 is operated from this state to supply pressured oil to the hydraulic cylinder 5, the maximum load pressure $P_{LS}$ increases. The pressured oil of the maximum load pressure $P_{LS}$ is introduced into the inlet port 196 of the variable throttle valve 110 through the load pressure introduction hole 203 connected to the oil passage 9 and the load pressure introduction oil passage 210. When the inlet port 196 and outlet port 197 of the variable throttle valve 110 thus communicate with each other, part of the pressured oil with the maximum load pressure $P_{LS}$ is bled off into the tank through the outlet port 197.

The amount of the aforementioned pressured oil bled off at this time increases as the area of the opening between the inlet port 196 and outlet port 197 increases. The greater the amount that is bled off, the lower the rate of increase of the maximum load pressure $P_{LS}$.

When the solenoid 201 of the electromagnetic proportional pressure control valve 111 is in a noncommunicating state, the spool 214 remains pushed up by the spring 215. The inlet port 199 and outlet port 200 of the electromagnetic proportional pressure control valve 111 are thus blocked off from each other.

In this state, the pilot pressure Pg given from the outlet port 200 of the electromagnetic proportional pressure control valve 111 to the pressure chamber 209 of the variable throttle valve 110 is zero. The spool 206 of the variable throttle valve 110 is thus pushed down by the spring 198.

When the spool 206 is pushed down, the inlet port 196 and outlet port 197 of the variable throttle valve 110 are blocked off from each other by the spool 206. The area of the opening between the ports 196 and 197 is thus reduced to the minimum, and the amount of pressured oil that is bled off by the variable throttle valve 110 is zero.

When electricity is applied to the solenoid 201 of the electromagnetic proportional pressure control valve 111, the spool 214 of the electromagnetic proportional pressure control valve 111 is pressed down by the thrust of the solenoid 201, allowing the inlet port 199 and outlet port 200 to communicate with each other.

With this, the pilot pressure Pg resulting from a reduction in the discharge pressure Pc of the auxiliary hydraulic pump 2 acts on the pressure chamber 209 of the variable throttle 20. The spool 206 of the variable throttle valve 110 thus moves up against the spring 198.

When the spool 206 moves up, the inlet port 196 and outlet port 197 of the variable throttle valve 110 communicate with each other. As a result, the pressured oil with the maximum load pressure $P_{LS}$ introduced into the inlet port 196 is bled off through the outlet port 197 into the tank.

The greater the pilot pressure Pg at this time, in other words, the greater the amount of electricity to the solenoid 201 of the electromagnetic proportional pressure control valve 111, the greater the amount of pressure bled off by the variable throttle valve 110.

As is evident from the description above, the variable bleed valve 11 allows the amount of pressured oil with the maximum load pressure $P_{LS}$ that is bled off to be arbitrarily adjusted by controlling the amount of electricity to the electromagnetic proportional pressure control valve 111. In other words, the rate of increase in the maximum load pressure $P_{LS}$ in the oil passage 9 can be arbitrarily adjusted by controlling the aforementioned amount of electricity.

Adjusting the amount of pressured oil that is bled off by the variable throttle valve 110 to zero results in a higher rate of increase in the maximum load pressure $P_{LS}$ acting on the pump discharge pressure control means 12, so the pump discharge pressure control means 12 rapidly increases the displacement volume (discharge oil amount) of the hydraulic pump 1.

As a result, the hydraulic cylinder 5 starts rapidly at the same time the operating valve 4 is operated.

In contrast, when the variable throttle valve 110 is in bleed off operating mode, the rate of increase in the maximum load pressure $P_{LS}$ acting on the pump discharge pressure control means 12 is lower than when the aforementioned bleed off amount is zero. In this case, the pump discharge pressure control means 12 moderately increases the displacement volume of the hydraulic pump 1, so the start up speed of the hydraulic cylinder 5 decreases.

Accordingly, the variable bleed valve 11 allows the start up response of the hydraulic cylinder 5 to be adjusted by controlling the amount of electricity to the solenoid 201 of the electromagnetic proportional pressure control valve 111.

The amount discharged by the hydraulic pump 1 is controlled to bleed off the pressured oil in the oil passage 9 for sensing the maximum load pressure $P_{LS}$ serving as the pilot pressure. The amount flowing in the load pressure sensing channel 9 is generally quite low. The pump pressure is controlled according to the pressure of the load pressure sensing passage 9, whereas the pressure of the load pressure sensing passage 9 is the pressure corresponding to the load pressure of the actuator and thus reacts exactly to the fluctuations in the load pressure of the actuator. It also reacts promptly to fluctuations in the load pressure. Energy loss can thus be minimized, and machines can be made more compact. The amount discharged from the hydraulic pump 1 can be controlled with greater precision.

In the aforementioned hydraulically operated device, only bleed off operations actually stop in the event of accidents such as malfunctions of the electromagnetic proportional pressure control valve 111 which lead to interruption of the pilot pressure Pg. In other words, the operation of the hydraulic cylinder 5 by the hydraulic pump 1 is unaffected even when accidents such as those described above occur. The reliability of the hydraulically operated device can thus be improved.

Moreover, the amount of pressured oil that is bled off can be arbitrarily adjusted by means of control signals output by a controller 300 described below, making such control easier to manage. Since pressured oil should be supplied by the application of electricity to the electromagnetic proportional pressure control valve 111 only when bleed off is needed, not only can pressured oil energy loss be further minimized, but electrical energy can also be economized.

Here, the aforementioned hydraulically operated device is equipped with a controller 300 connected to the variable bleed valve 11 as described above, and this controller 300 comprises, as shown in FIG. 20, a mode setting memory component 310, a mode select setting component 320, and a control signal output component 330.

Figure 23:
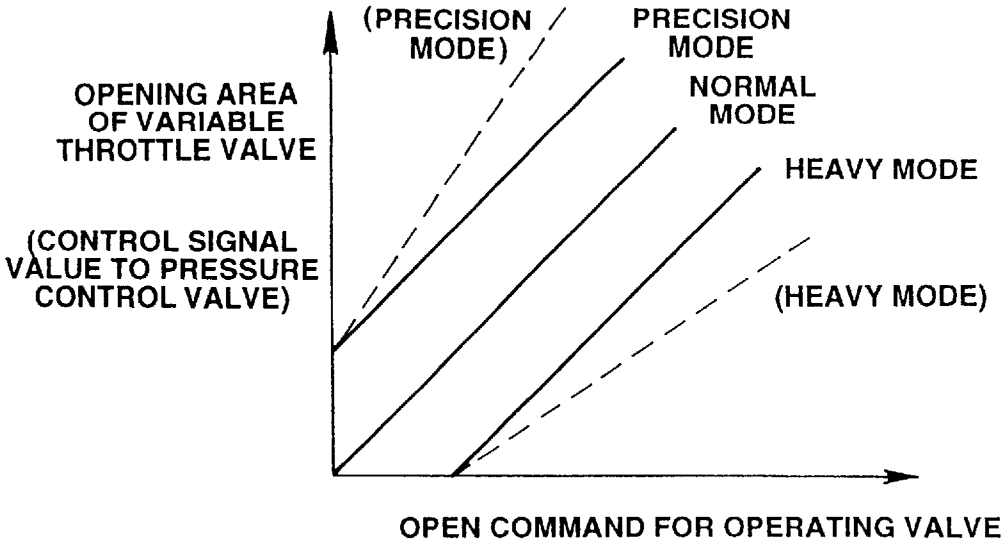
FIG. 23 is a graph depicting an example of the relation between input and output when a mode set memory means has been set and stored.

The mode setting memory component 310 sets and stores a plurality of input-output relations according to the operating configuration of the hydraulic cylinder 5. As shown in FIG. 23, for example, three different modes comprising an ordinary mode which is the ordinary operating state, a heavy operating mode requiring considerable force, and a more precise operating mode requiring highly precise manipulations are set and stored in terms of the input-output relations between the open command to the operating valve 4 and the control signals to the solenoid 201 of the electromagnetic proportional pressure control valve 111, that is, the area of the opening of the variable throttle valve 110. Although these three input-output relations have the same degree of variation relative to each other, the area of the opening of the variable throttle valve 110 in terms of open commands to the same operating valve 4 is preset and stored so as to increase in ascending order from heavy operating mode, to ordinary mode, to precision operating mode.

The mode select setting component 320 selects and sets one of the three input-output relations set and stored in the mode setting memory component 310. This mode select setting component 320 selects and sets a corresponding input-output relation according to the operation of a mode select switch not shown in the figure and located in the driver seat of a hydraulic shove, for example.

The control signal output component 330 converts the open command for the operating valve 4 based on the input-output relation selected by the mode select setting component 320, and the converted control signal is given to the solenoid 201 of the electromagnetic proportional pressure control valve 111.

Thus, in the aforementioned hydraulically operated device, a control signal output from the controller 300 in response to an open command for the operating valve 4 can be modified according to the operating configuration of the hydraulic cylinder 5. In other words, when heavy operating mode is selected and set by the mode select setting component 320, the area of the opening of the variable throttle valve 110 for open commands to the operating valve 4 can be further reduced. Thus, in this heavy operating mode, more pressured oil can be supplied to the hydraulic cylinder 5 and the hydraulic cylinder can be rapidly operated, even though the control input of the operating lever (not shown in figure) is the same.

Meanwhile, when precision operating mode is selected and set, the area of the opening in the variable throttle valve 110 can be further increased for open commands to the operating valve 4. Thus, in precision operating mode, less pressured oil can be supplied to the hydraulic cylinder 5 and the hydraulic cylinder can be moderately operated, even though the control input of the operating lever (not shown in figure) is the same.

The hydraulic cylinder 5 is provided to drive the operating unit of the hydraulic shovel (such as a boom, arm, or bucket). A hydraulically operated device equipped with the variable bleed valve 11 can thus provide operating speeds and operating sensitivity for an operating unit that are suitable for the operating configuration of the aforementioned hydraulic shovel.

The plurality of input-output relations set and stored in the mode setting memory component 310 are not limited to those depicted in FIG. 5.

Figure 24:
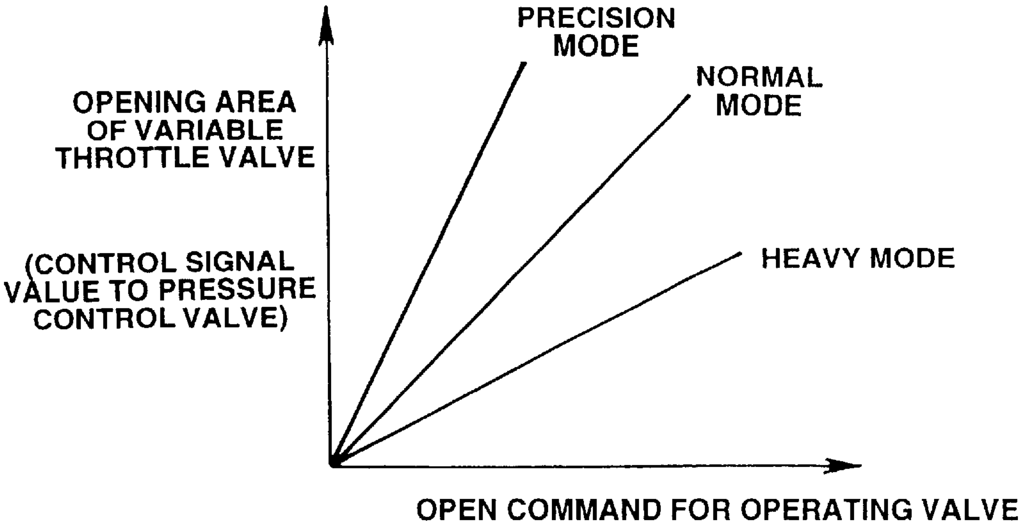
FIG. 24 is a graph depicting another example of the relation between input and output when a mode set memory means has been set and stored.
Figure 25:
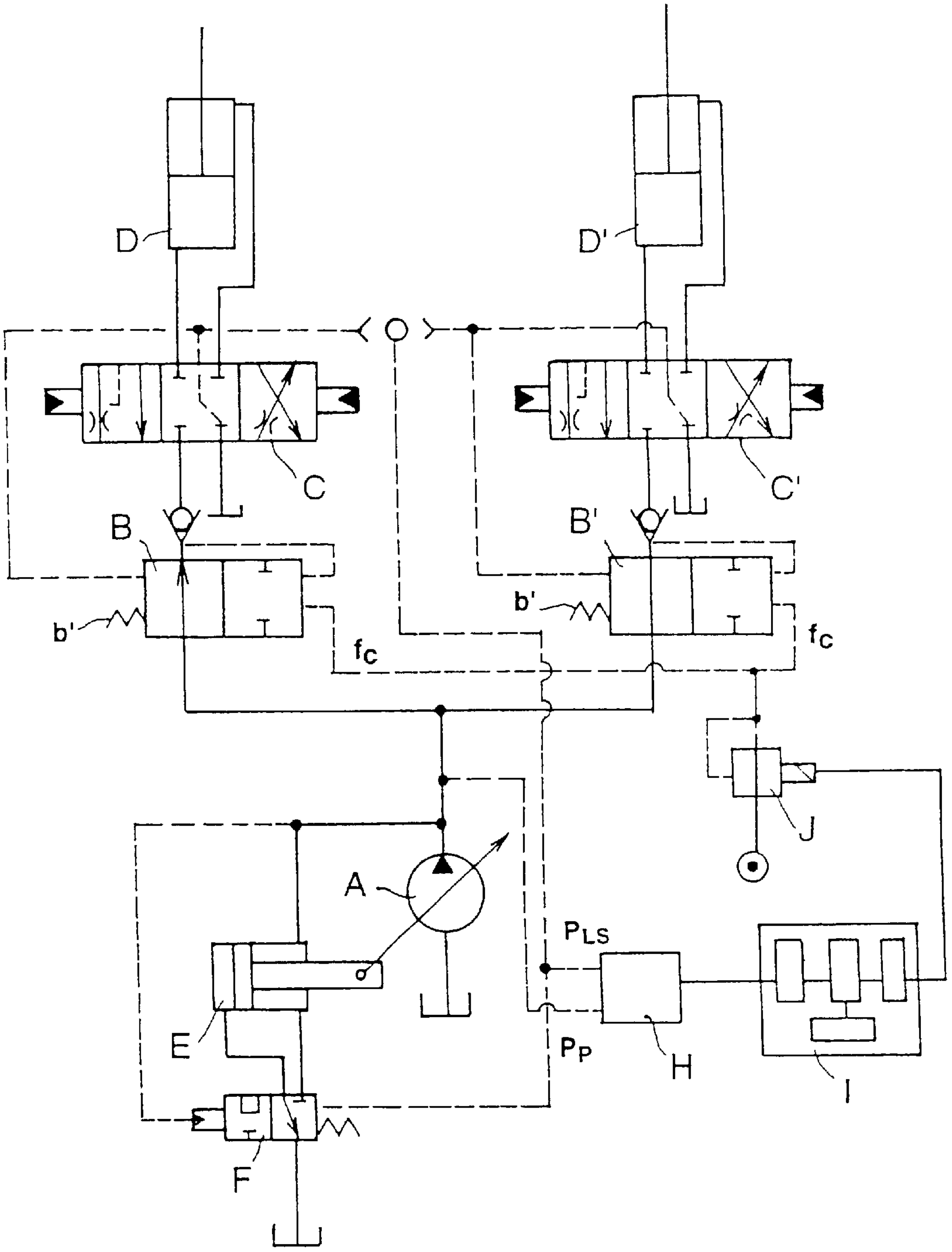
FIG.25 PRIOR ART
FIG. 25 is a circuit diagram of oil pressure, depicting the structure of a conventional hydraulic device equipped with a pressure compensating valve.
Figure 26:
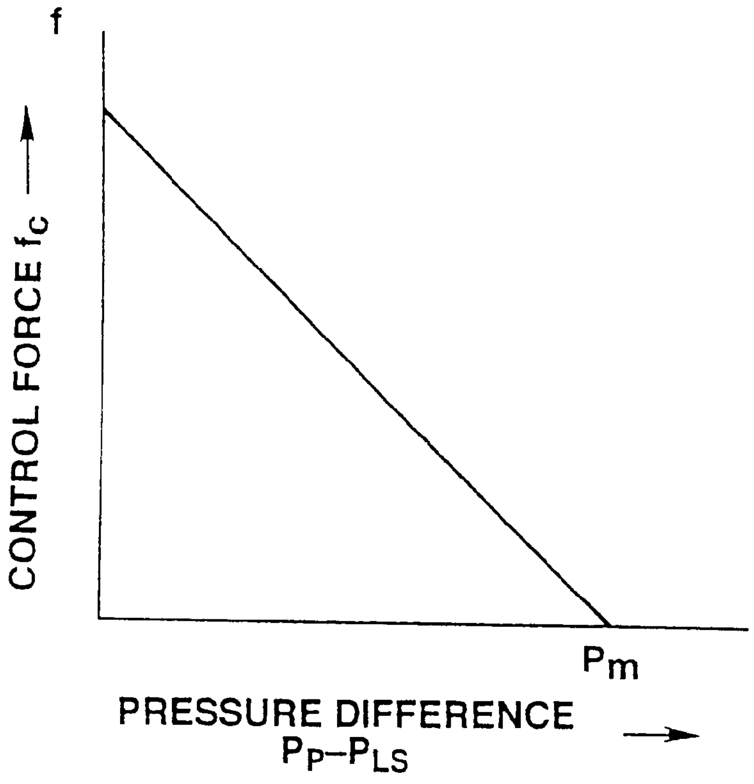
FIG.26 PRIOR ART
FIG. 26 is a graph depicting the relation between pressure difference and control force.
Figure 27:
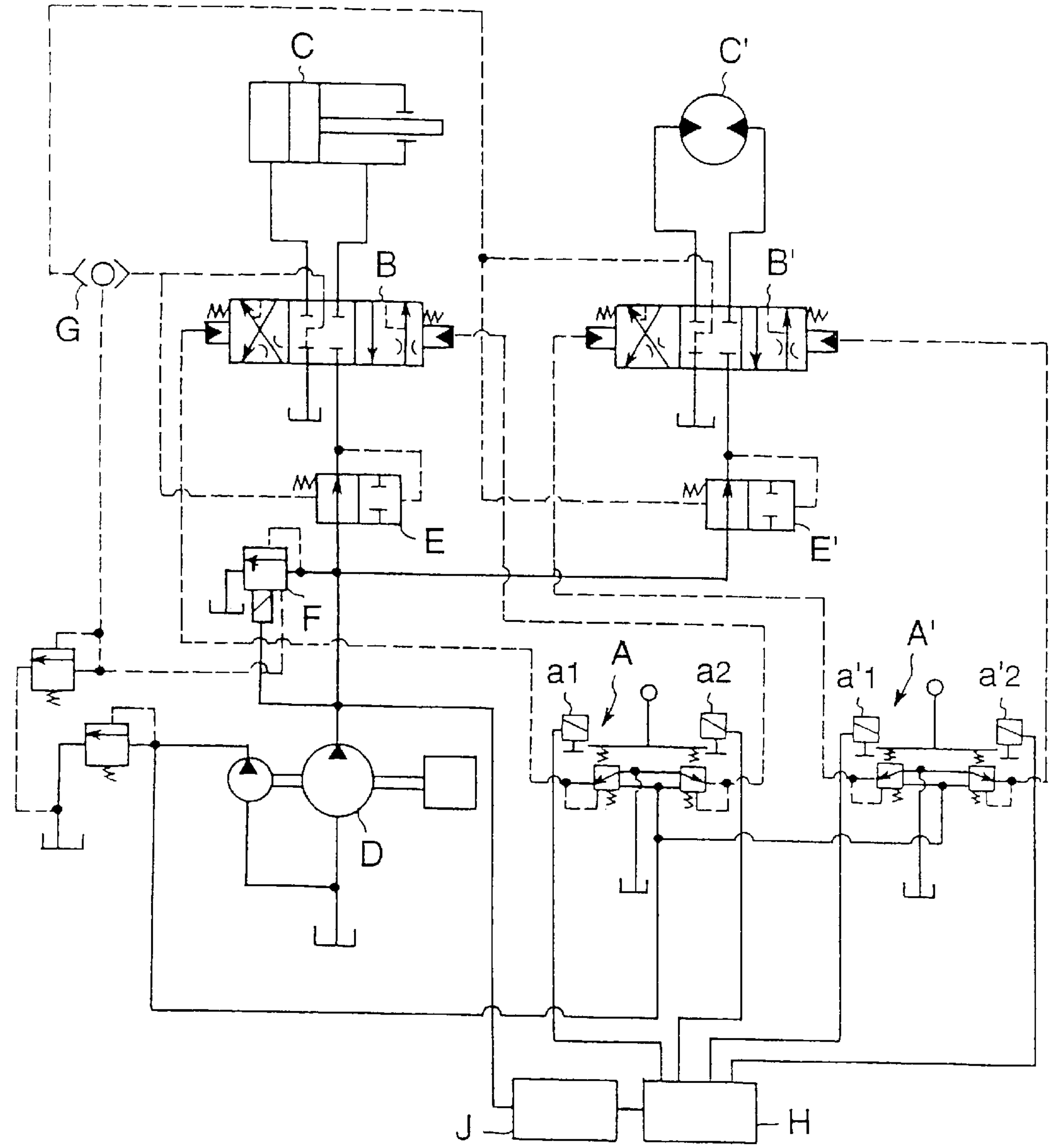
FIG.27 PRIOR ART
FIG. 27 is a circuit diagram of oil pressure in a conventional hydraulically operated device in which an unloading pressure control valve is used.
Figure 28:
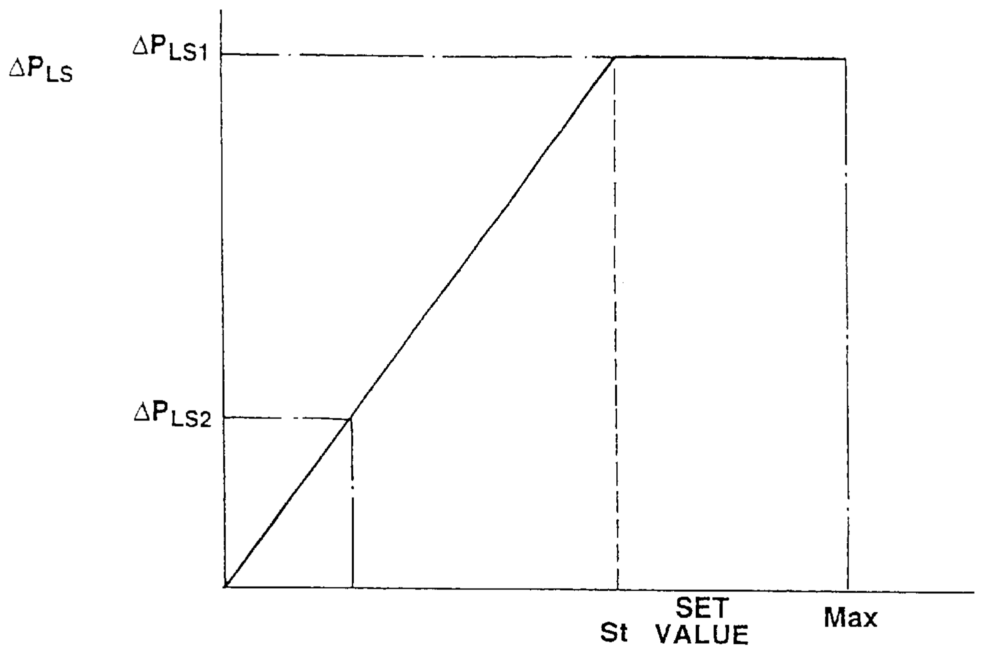
FIG.28 PRIOR ART
FIG. 28 is a graph depicting the relation between the pressure difference and the control input of an operating device.
Figure 29:
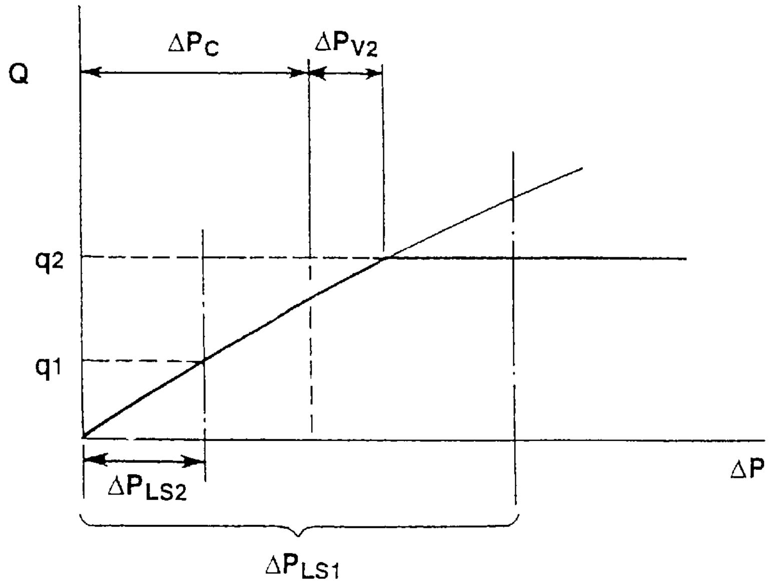
FIG.29 PRIOR ART
FIG. 29 is a graph depicting the relation between the pressure difference before and after a flow regulating valve and the amount of oil Q supplied to a hydraulic motor.

FIG. 24 is a graph depicting another example of input-output relations set and stored by the mode setting memory component 310. The input-output relations depicted in FIG. 24 are designed so that the rate of change increases in the order from the heavy operating mode, to ordinary mode, to precision operating mode. The use of this mode setting selection means results in a different proportion of change in the speed by which the pressured oil in the load pressure sensing passage 9 is bled off into the tank, allowing the operating speeds and operating sensitivity of the hydraulic cylinder 5 to be set with even greater precision according to the operating configuration.

A combination of the input-output relations depicted in FIGS. 23 and 24 can provide input-output relations such as that indicated by the broken lines in FIG. 23 for the heavy operating mode and precision operating mode in relation to ordinary mode. In this case, the input-output relations can be set even more precisely than those depicted in FIG. 24.

The variable throttle valve 110 is constructed in such a way as to increase the area of the opening between the inlet port 196 and outlet port 197 by means of the action of the pilot pressure Pg, but conversely it can also be constructed in such a way as to reduce the area of the aforementioned opening by means of the action of the pilot pressure Pg.

The variable throttle valve 110 is also constructed in such a way that the spool 206 is pressed in the cut-off direction (downward in FIG. 22) by the spring 198 and the spool 206 is pressed in the communicating direction (upward in FIG. 22) by the pressure in the pressure chamber 209, but it can also be constructed in such a way that the elastic force of the spring 198 and the pressure of the pressure chamber 209 act in directions opposite those described above.

The variable bleed valve 11 is such that the spool 206 of the variable throttle valve 110 and the spool 214 of the electromagnetic proportional pressure control valve 111 are located coaxially, making it possible to achieve more compact shapes with a shorter lateral length. That is, when the lay out of the variable bleed valve 11, for example, is like that depicted in FIG. 21, a more compact embodiment can be devised because the electromagnetic proportional pressure control valve 111 can be mounted further inside than the spring case 4*b* of the operating valve 4, that is, inside the surface defined by the spring case 4*b* when a valve block is used in a generally right-angled parallelepiped form.

The variable bleed valve 11 is such that the spring 215 of the electromagnetic proportional pressure control valve 111 is in contact with the upper end of the spool 206 of the variable throttle valve 110. According to this structure, the operating force of the spool 206 is mechanically fed back to the spool 214 of the electromagnetic proportional pressure control valve 111 through the spring 215 when the spool 206 of the variable throttle valve 110 is operated. The operating characteristics (response) of the spool 206 of the variable throttle valve 110 can thus be improved, allowing more precise bleed off operations to be managed.

The variable bleed valve 11 is also designed to allow the elastic force of the spring 195 of the variable throttle valve 110 to be fine tuned by rotating the adjustment screw 217. When a plurality of variable bleed valves 11 are manufactured, the machining precision of the various parts and the elastic force of the spring 198 used in the individual variable bleed valves 11 are not uniform. Despite the uneven elastic force of the spring 198, however, it is possible to compensate for the uneven elastic force of the spring 198 by adjusting the elastic force of the spring 195 by rotating the adjustment screw 217.

What is claimed is:

1. A pressure compensating valve through which pressurized oil fed from a hydraulic pump (1) to a hydraulic actuator (5) passes, comprising:

a main valve (20), that operates in such a way as to increase an area of an opening between an inlet port (24) and an outlet port (25) thereof by means of pressure acting on a first pressure receiving component (21), and operates in such a way as to reduce the area of the opening by means of pressure acting on a second pressure receiving component (22) and pressure acting on a third pressure receiving component (23), and that allows pressure (Pa) of the pressurized oil flowing into the inlet port (24) to act on the first pressure receiving component (21) and pressure (Pb) of a load driven by the pressurized oil flowing out from the outlet port (25) to act on the second pressure receiving component (22);

a throttle (36) for reducing the pressure (Pa) of the pressurized oil at the inlet port (24); and a variable throttle valve (30) for adjusting according to throttle level thereof the pressure reduced by the throttle (36) to produce a control pressure (Pe), and allowing the control pressure (Pe) to act on the third pressure receiving component (23).

2. A hydraulically operated device comprising:

a plurality of hydraulic actuators (5) to which pressurized oil discharged from a variable delivery hydraulic pump (1) is supplied via a respective pressure compensating valve (7) and a respective directional control valve (4);

pressure output means (8) for outputting pressure ($P_{LS}$) to a load pressure sensing passage (9) according to maximum load pressure among load pressures acting on the actuators (5); and pump discharge pressure control means (12) for controlling discharge pressure of the variable delivery hydraulic pump (1) based on the pressure ($P_{LS}$) output from the pressure output means (8), wherein each pressure compensating valve (7) comprises:

a main valve (20), that operates in such a way as to increase an area of an opening between an inlet port (24) and an outlet port (25) thereof by means of pressure acting on a first pressure receiving component (21), and operates in such a way as to reduce the area of the opening by means of pressure acting on a second pressure receiving component (22) and pressure acting on a third pressure receiving component (23), and that allows pressure (Pa) of the pressurized oil flowing into the inlet port (24) to act on the first pressure receiving component (21) and pressure (Pb) of a load driven by the pressurized oil flowing out from the outlet port (25) to act on the second pressure receiving component (22);

a throttle (36) for reducing the pressure (Pa) of the pressurized oil at the inlet port (24); and a variable throttle valve (30) for adjusting according to throttle level thereof the pressure reduced by the throttle (36) to produce a control pressure (Pe), and allowing the control pressure (Pe) to act on the third pressure receiving component (23), and a variable bleed valve (11) is provided in the load pressure sensing passage (9).

3. A hydraulically operated device comprising:

a plurality of hydraulic actuators (5) to which pressured oil discharged from a variable delivery hydraulic pump (1) and having passed through a pressure compensating valve (7) and a directional control valve (4) is supplied according to outside input operations;

pressure output means (8) for outputting pressure ($P_{LS}$) to a load pressure sensing passage (9) according to maximum load pressure among load pressures acting on each of the actuators (5);

pump discharge pressure control means (12) for controlling discharge pressure of the variable delivery hydraulic pump (1) based on the pressure ($P_{LS}$) output from the pressure output means (8);

a pressure compensating valve (7) comprising: a main valve (20), that operates in such a way as to increase an area of an opening between an inlet port (24) and an outlet port (25) thereof by means of pressure acting on a first pressure receiving component (21), and operates in such a way as to reduce the area of the opening by means of pressure acting on a second pressure receiving component (22) and pressure acting on a third pressure receiving component (23), and that allows pressure (Pa) of the pressurized oil flowing into the inlet port (24) to act on the first pressure receiving component (21) and pressure (Pb) of a load driven by the pressurized oil flowing out from the outlet port (25) to act on the second pressure receiving component (22); a throttle (36) for reducing the pressure (Pa) of the pressurized oil at the inlet port (24); and a variable throttle valve (30) for adjusting according to throttle level thereof the pressure reduced by the throttle (36) to produce a control pressure (Pe), and allowing the control pressure (Pe) to act on the third pressure receiving component (23);

mode setting means (310) for setting a plurality of mutually-different operation modes according to operating configuration of the actuators (5);

mode selection means (320) for selecting a desired operation mode from among the plurality of the operation modes set by the mode setting means (310);

control pressure output means (111) for outputting control pressure according to both the outside input operations and the operation mode selected by the mode selection means (320); and a variable throttle valve (110) for adjusting bleed-off amount of the pressured oil in the load pressure sensing passage (9) according to the control pressure output from the control pressure output means (111).

* * * * *